United States Patent
Su et al.

(10) Patent No.: US 12,313,900 B2
(45) Date of Patent: May 27, 2025

(54) PHOTOGRAPHING LENS ASSEMBLY, LENS ASSEMBLY DRIVING MODULE AND ELECTRONIC DEVICE

(71) Applicant: LARGAN DIGITAL CO., LTD., Taichung (TW)

(72) Inventors: Heng-Yi Su, Taichung (TW); Hao-Jan Chen, Taichung (TW); Ming-Ta Chou, Taichung (TW); Te-Sheng Tseng, Taichung (TW)

(73) Assignee: LARGAN DIGITAL CO., LTD., Taichung (TW)

( * ) Notice: Subject to any disclaimer, the term of this patent is extended or adjusted under 35 U.S.C. 154(b) by 0 days.

(21) Appl. No.: 18/603,322

(22) Filed: Mar. 13, 2024

(65) Prior Publication Data

US 2024/0219679 A1  Jul. 4, 2024

Related U.S. Application Data

(63) Continuation of application No. 17/026,498, filed on Sep. 21, 2020, now Pat. No. 11,960,141.

(30) Foreign Application Priority Data

Jun. 20, 2020 (TW) ................................ 109120975

(51) Int. Cl.
| | | |
|---|---|---|
| *G02B 15/14* | (2006.01) | |
| *G02B 7/02* | (2021.01) | |
| *G02B 7/04* | (2021.01) | |
| *G02B 7/105* | (2021.01) | |
| *G03B 13/32* | (2021.01) | |
| *G02B 7/10* | (2021.01) | |
| *G02B 13/00* | (2006.01) | |

(52) U.S. Cl.
CPC ............... *G02B 7/04* (2013.01); *G02B 7/021* (2013.01); *G02B 7/105* (2013.01); *G03B 13/32* (2013.01); *G02B 7/10* (2013.01); *G02B 13/001* (2013.01)

(58) Field of Classification Search
CPC .......... G02B 7/04; G02B 7/021; G02B 7/105; G02B 7/10; G02B 13/001; G03B 13/32
USPC ................................ 359/694, 814, 823, 824
See application file for complete search history.

(56) References Cited

U.S. PATENT DOCUMENTS

| | | |
|---|---|---|
| 7,242,534 B2 | 7/2007 | Kano et al. |
| 7,394,603 B2 | 7/2008 | Shiraki et al. |
| 7,885,023 B2 | 2/2011 | Kim |
| 7,898,753 B2 | 3/2011 | Yu |
| 7,932,648 B2 | 4/2011 | Jung |
| 8,314,520 B2 | 11/2012 | Jung |
| 8,320,756 B2 | 11/2012 | Jacobsen et al. |

(Continued)

*Primary Examiner* — Mahidere S Sahle
(74) *Attorney, Agent, or Firm* — Troutman Pepper Locke LLP; Tim Tingkang Xia, Esq.

(57) ABSTRACT

Provided is a lens assembly driving module including a photographing lens assembly, a first driving mechanism and a second driving mechanism. The photographing lens assembly includes N lens elements and has an optical axis passing through the N lens elements. The first driving mechanism drives at least N/2 said lens elements to move along the optical axis of the photographing lens assembly. The second driving mechanism enables a relative distance along the optical axis of two adjacent ones of the N lens elements to vary. Therefore, any specific one of the lens elements is capable of being driven to optimize optical imaging resolution of various fields of view independently within a real shot at different object distances.

16 Claims, 21 Drawing Sheets

(56) References Cited

U.S. PATENT DOCUMENTS

| | | |
|---|---|---|
| 8,350,950 B2 | 1/2013 | Raschke |
| 8,503,106 B2 | 8/2013 | Ko et al. |
| 8,810,714 B2 | 8/2014 | Seol et al. |
| 8,922,919 B2 | 12/2014 | Park et al. |
| 9,019,423 B2 | 4/2015 | Seol et al. |
| 9,019,624 B2 | 4/2015 | Park et al. |
| 9,046,737 B2 | 6/2015 | Seol et al. |
| 9,116,415 B2 | 8/2015 | Raschke |
| 9,158,088 B2 | 10/2015 | Suzuki |

PHOTOGRAPHING LENS ASSEMBLY, LENS ASSEMBLY DRIVING MODULE AND ELECTRONIC DEVICE

RELATED APPLICATIONS

This application is a continuation application of U.S. application Ser. No. 17/026,498, filed on Sep. 21, 2020, now approved and claims priority to Taiwan Application Serial Number 109120975, filed on Jun. 20, 2020, which is incorporated by reference herein in its entirety.

BACKGROUND OF THE INVENTION

Field of the Invention

The present disclosure relates to photographing lens assemblies and lens assembly driving modules having the same and, more particularly, to a photographing lens assembly applicable to an electronic device and a lens assembly driving module having the same.

Description of the Prior Art

With technology being ever-changing, electronic devices which come with optical lens assemblies not only have broad applications but also have diverse needs for optical lens assemblies. However, conventional optical lens assemblies seldom meet the requirements for both long- and short-distance photography nor strike a balance between sensitivity, aperture, size, volume, and angle of view. Therefore, the present disclosure provides an optical lens assembly capable of changing the distance between the lens assembly and electronic photosensitive members and the distance between lens elements to attain satisfactory central image quality and peripheral image quality in different photographic scenarios, thereby meeting market needs.

SUMMARY OF THE INVENTION

The present disclosure provides a lens assembly driving module, comprising: a photographing lens assembly comprising N lens elements and having an optical axis, the optical axis passing through the N lens elements, wherein N is a positive integer; a first driving mechanism for driving at least N/2 said lens elements to move along the optical axis of the photographing lens assembly; and a second driving mechanism for driving one of two adjacent ones of the N lens elements to move toward the other one along the optical axis. The lens elements driven by the first driving mechanism are in the number of M, where M is a positive integer, and the M lens elements include a plastic lens element, satisfying the relation N/2≤M≤N. The lens elements driven by the second driving mechanism are in the number of F, where F is a positive integer, and the F lens elements include a plastic lens element, satisfying the relation 1≤F<N/2.

The present disclosure provides an electronic device which comprises the lens assembly driving module of the present disclosure.

When N, M, F satisfy the relations, any specific one of the lens elements of the photographing lens assembly is capable of being driven independently to optimize optical imaging resolution of various fields of view within a real shot at different object distances. Therefore, the lens assembly driving module of the present disclosure is capable of optimizing local fields of view independently.

DETAILED DESCRIPTION OF THE EMBODIMENTS

Figure 1A:
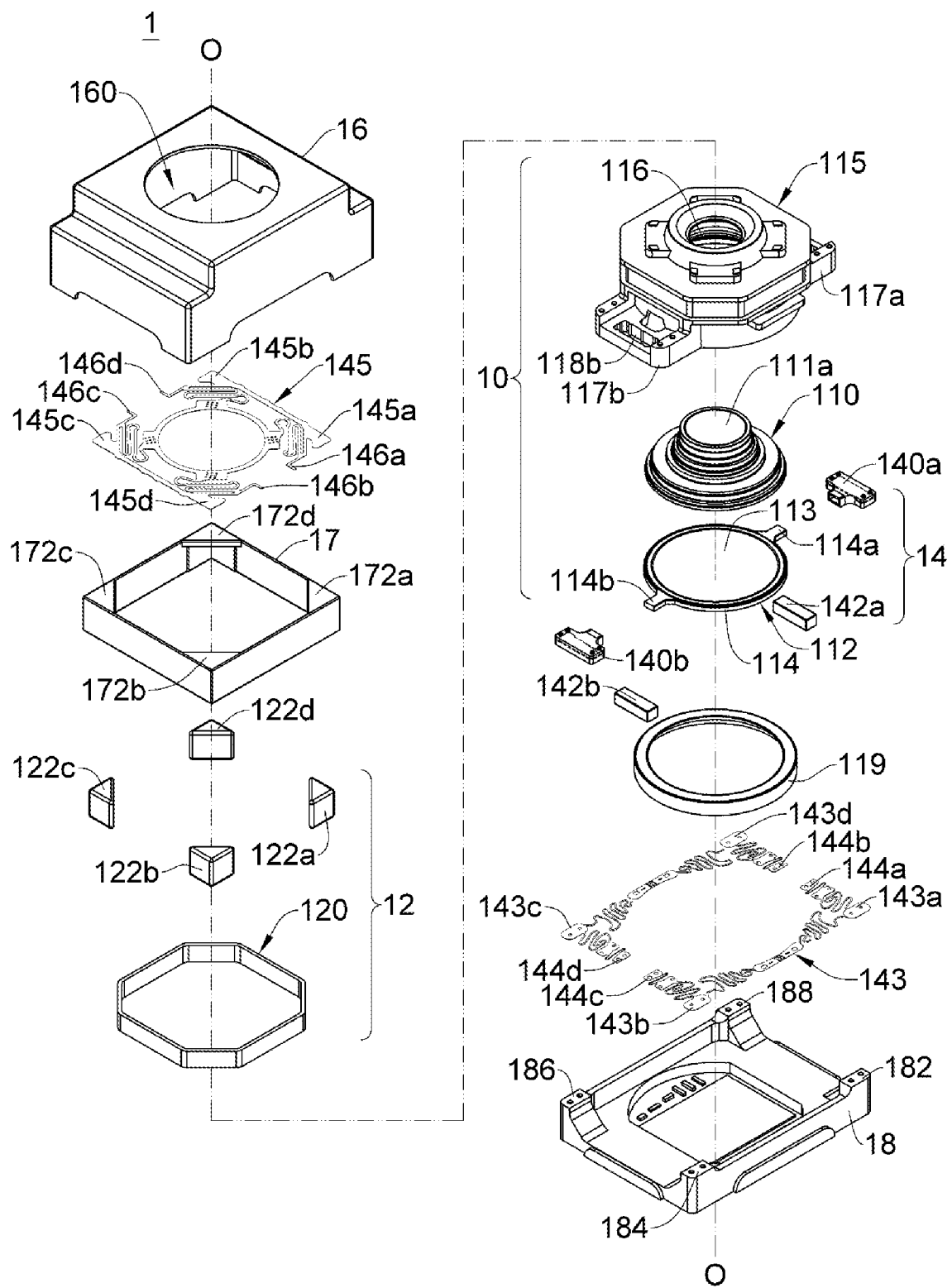
FIG. 1A is an exploded view of a lens assembly driving module according to a first embodiment of the present disclosure, with the object side at the top and the image side at the bottom.

The present disclosure provides a lens assembly driving module, comprising a photographing lens assembly, a first driving mechanism and a second driving mechanism. The photographing lens assembly comprises N lens elements and has an optical axis. The optical axis passes through the N lens elements, where N is a positive integer. The first driving mechanism drives at least N/2 said lens elements to move along the optical axis of the photographing lens assembly. The lens elements driven by the first driving mechanism are in the number of M, where M is a positive integer, and the M lens elements include a plastic lens element, satisfying the relation $N/2 \leq M \leq N$ and the relation $(2/3)*N \leq M \leq N$, to effectively reduce the total length of the optical system and prevent the volume of the driving mechanism from being overly great. The second driving mechanism drives one of two adjacent ones of the N lens elements to move toward the other one along the optical axis. The lens elements driven by the second driving mechanism are in the number of F, where F is a positive integer, and the F lens elements include a plastic lens element, satisfying the relation $1 \leq F < N/2$ and the relation $1 \leq F < (1/3)*N$, to reduce optical sensitivity deterioration of optical design.

In an embodiment of the present disclosure, all the N lens elements of the photographing lens assembly can move along the optical axis to simplify the driving mechanism, dispense with the need for an additional mechanism for fixing lens elements in place, and effectively reduce tilt errors of the optical axis of the entire optical system.

In an embodiment of the present disclosure, the first driving mechanism and the second driving mechanism enable one of two adjacent ones of the N lens elements to move toward the other one along the optical axis, so as to reduce power consumption of the second driving mechanism, simplify structural design of the second driving mechanism, and effectively downsize the lens assembly driving module.

In an embodiment of the present disclosure, the second driving mechanism further comprises a preload mechanism (preload structure). The preload mechanism generates a preload force between the adjacent lens elements, such that one of the adjacent lens elements moves toward the other lens element under the preload force, so as to effectively ensure optical precision of the distance between the lens elements and reduce the likelihood of optical quality deterioration. In an embodiment of the present disclosure, the preload force acts in a direction parallel to the optical axis, such that the optical axis collimation uniformity between the adjacent lens elements is maintained.

In an embodiment of the present disclosure, the second driving mechanism further comprises a resilient member for connecting the adjacent lens elements. The resilient member is sheet-shaped, but the present disclosure is not limited thereto. The sheet-shaped resilient member is suitable for mass production and easy to mount in place, thereby effectively reducing the volume of the lens assembly driving module.

In an embodiment of the present disclosure, the resilient member generates a preload force between the adjacent lens elements, such that one of the adjacent lens elements moves toward the other lens element under the preload force, so as to effectively ensure optical precision of the distance between the lens elements and reduce the likelihood of optical quality deterioration. In an embodiment of the present disclosure, the preload force acts in a direction parallel to the optical axis, such that the optical axis collimation uniformity between the adjacent lens elements is maintained.

In an embodiment of the present disclosure, all the N lens elements driven by the first driving mechanism move along the optical axis, so as to decrease the probability of assembly tolerance but increase the operation precision of the first driving mechanism and thus render deviation of movement unlikely.

In an embodiment of the present disclosure, the F lens elements driven by the second driving mechanism are also driven by the first driving mechanism along the optical axis, so as to shorten the operation distance associated with the second driving mechanism, effectively enhance the feasibility of overall optical design, and reduce the difficulty in optical design.

In an embodiment of the present disclosure, one of two adjacent ones of the N lens elements moves toward the other one along the optical axis, so as to maximize independent optimization capability for local fields of view without causing unnecessary optical specification deterioration.

In an embodiment of the present disclosure, the plastic lens element among the F lens elements is the largest one of the N lens elements in outer diameter, such that satisfactory optical corrections can be made to the largest field of view.

In an embodiment of the present disclosure, one of the F lens elements driven by the second driving mechanism is the lens element positioned closest to the image side in the photographing lens assembly, so as to minimize the chance of deterioration of optical image quality.

In an embodiment of the present disclosure, the first driving mechanism further comprises at least one rolling member which provides degrees of freedom to the M lens elements in moving parallel to the optical axis and thereby reduces mechanism complexity of the first driving mechanism, provides a long driving distance, reduces the friction between the operating mechanisms, and saves electric power.

In an embodiment of the present disclosure, the first driving mechanism further comprises a first coil member and a first magnet which correspond in position to each other, so as to simplify mechanism design and effectively reduce the number of required parts and components.

In an embodiment of the present disclosure, the second driving mechanism further comprises a second coil member and a second magnet which correspond in position to each other.

In an embodiment of the present disclosure, the photographing lens assembly further comprises a carrier member.

The carrier member has therein an internal space defined. The M lens elements driven by the first driving mechanism are disposed in the internal space. The carrier member results from integration of a lens barrel and its carrier and is effective in reducing the process steps required for automated assembly, reducing production cost, enhancing the manufacturing efficiency of injection molding, and reducing the likelihood of dust fall and assembly tilt which may otherwise occur to a conventional assembling process of individual parts and components.

In an embodiment of the present disclosure, the F lens elements driven by the second driving mechanism are also disposed in the internal space of the carrier member, such that circularity of the integrated carrier member serves as a standard reference for the F lens elements and thereby ensures the coaxial uniformity between the lens elements.

In an embodiment of the present disclosure, the carrier member further comes with one of the first magnet and the second magnet to facilitate automated assembly.

In an embodiment of the present disclosure, the carrier member further comes with one of the first coil member and the second coil member. The coil members are lustrous and thus conducive to an automation process performed with automated optical inspection, so as to control the automated recognition success rate of the driving mechanisms easily.

In an embodiment of the present disclosure, the N lens elements satisfy the relation $5<N\leq11$ and thus meet design requirements, namely high pixel count, large aperture, and satisfactory peripheral view field imaging resolution. In an embodiment of the present disclosure, the high pixel count is greater than 30,000,000, the large aperture is defined by an aperture value (Fno) less than 2.2, and satisfactory peripheral view field imaging resolution approximates to the MTF (modulation transfer function) imaging resolution level of the central field of view.

In an embodiment of the present disclosure, the first driving mechanism calibrates central image quality, and the second driving mechanism calibrates peripheral image quality, wherein the peripheral image quality is about the focusing imaging resolution of off-axis fields of view.

In an embodiment of the present disclosure, the first driving mechanism drives the photographing lens assembly to perform focusing operation in long- and short-distance photography. The long-distance photography takes place when the distance between the object to be photographed and the photographing lens assembly approximates to the infinite. The short-distance photography takes place when the distance between the object to be photographed and the photographing lens assembly is less than 120 cm, or even 60, 30, 20, 10 cm, but the present disclosure is not limited thereto.

In an embodiment of the present disclosure, the first driving mechanism drives the second driving mechanism to move along the optical axis, so as to ensure the optical design precision of the photographing lens assembly. In an embodiment of the present disclosure, the second driving mechanism is a solenoid valve, but the present disclosure is not limited thereto.

The present disclosure provides an electronic device which comprises the lens assembly driving module of the present disclosure.

The lens assembly driving module of the present disclosure is illustrated by specific embodiments, depicted by accompanying drawings, and described in detail below. The accompanying drawings are not drawn to scale; thus, constituent elements shown in the accompanying drawings can be enlarged or diminished in dimensions for the sake of illustration.

First Embodiment

Figure 1B:
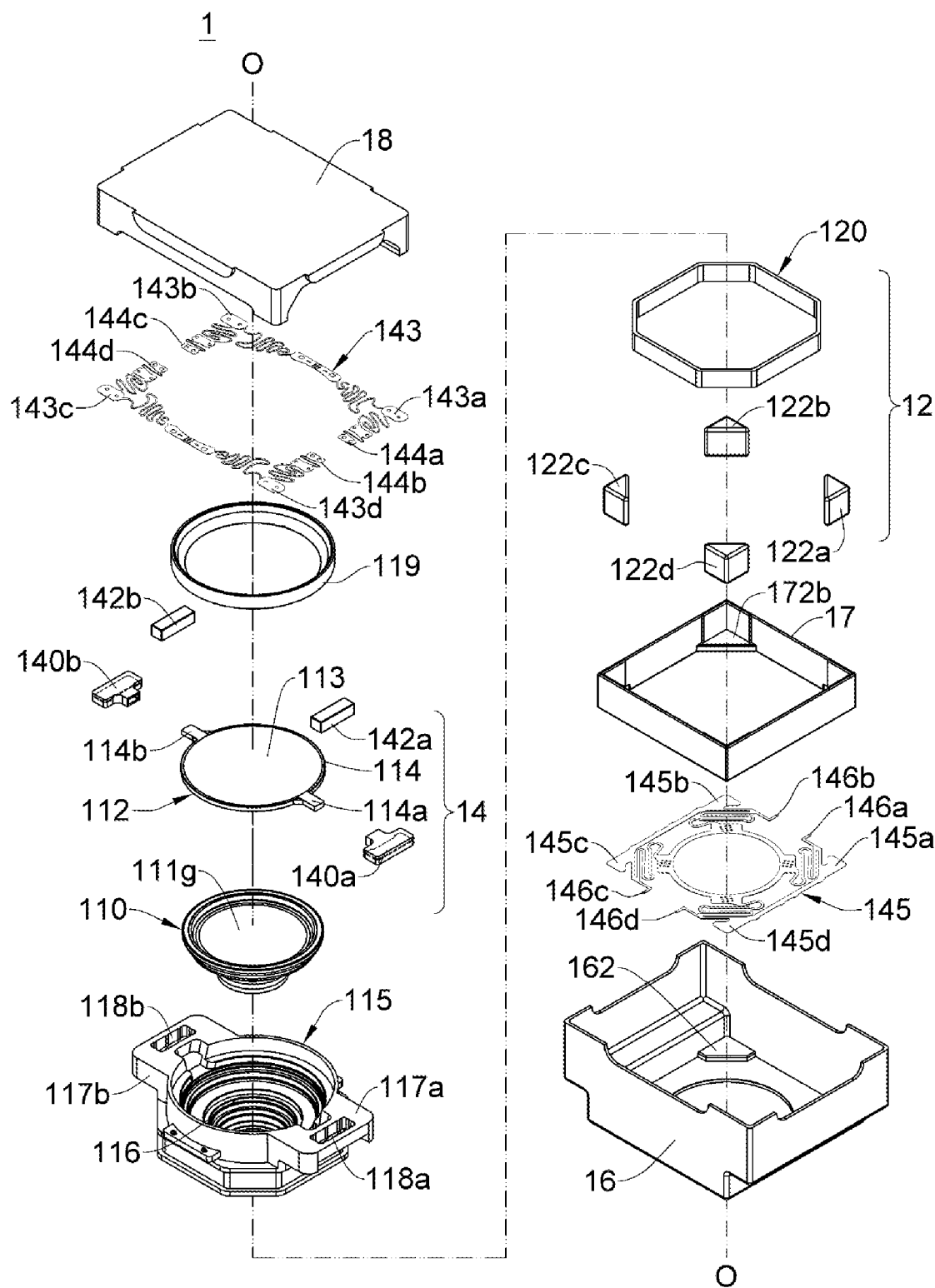
FIG. 1B is an exploded view of the lens assembly driving module according to the first embodiment of the present disclosure, with the image side at the top and the object side at the bottom.
Figure 2A:
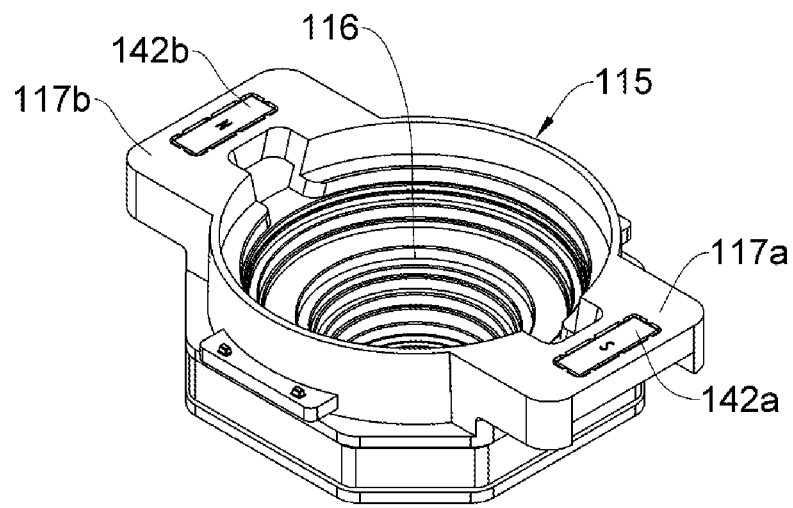
FIG. 2A is a perspective view of a carrier member which a second magnet is mounted on according to the first embodiment of the present disclosure.
Figure 2B:
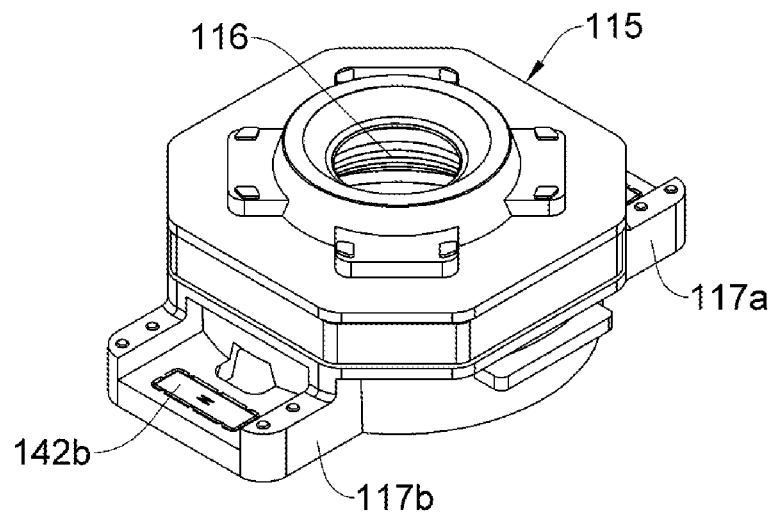
FIG. 2B is a perspective view of the carrier member shown in FIG. 2A and turned upside down in FIG. 2B.
Figure 3A:
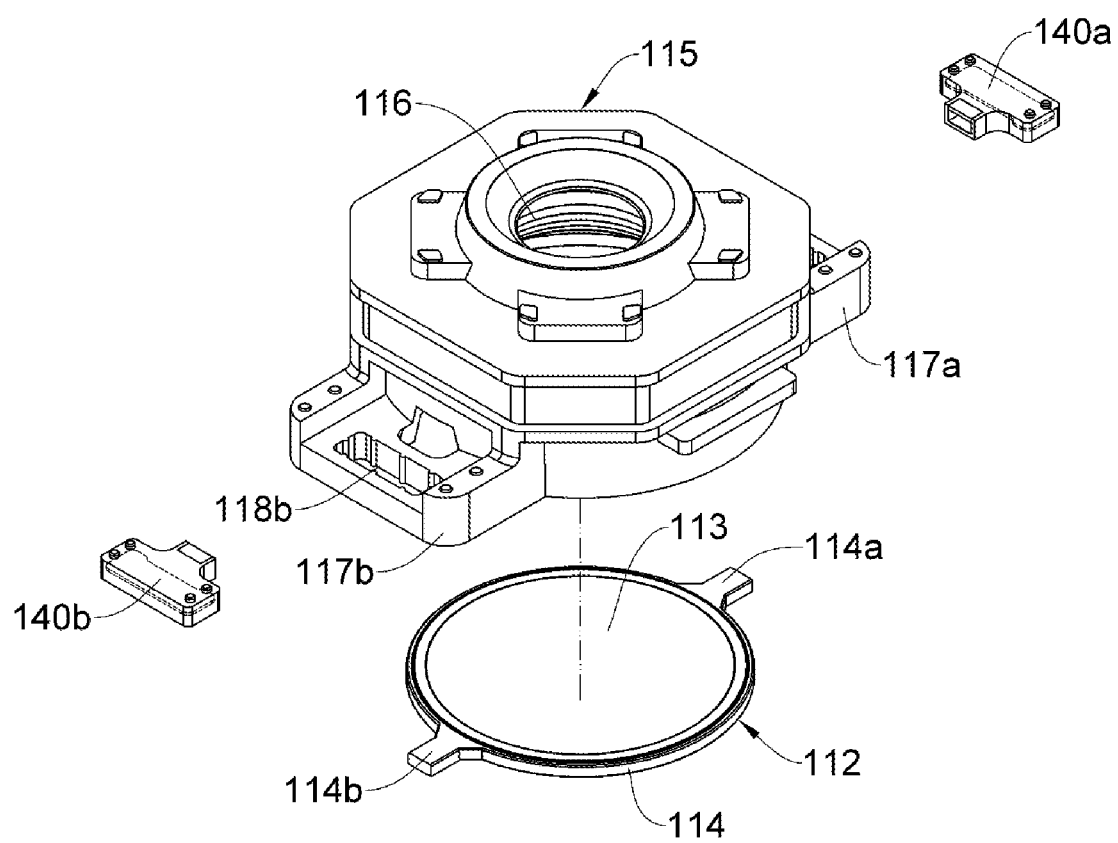
FIG. 3A is an exploded view, including a carrier member, second lens assembly group and second coil member, according to the first embodiment of the present disclosure.
Figure 3B:
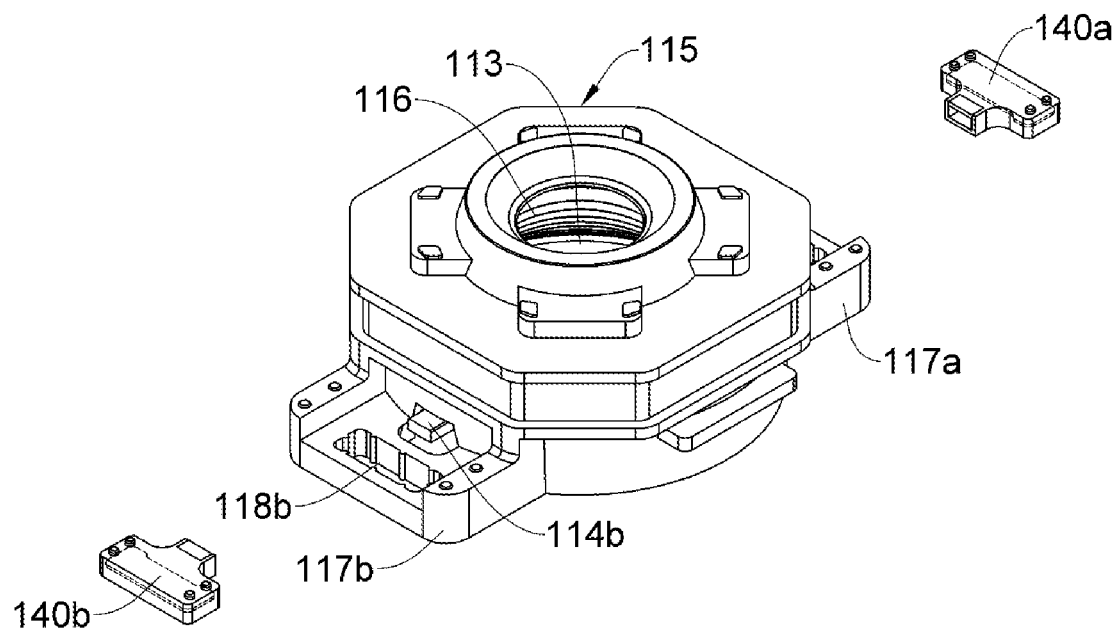
FIG. 3B is an exploded view, including the carrier member which the second lens assembly group is mounted on and the second coil member, according to the first embodiment of the present disclosure.
Figure 3C:
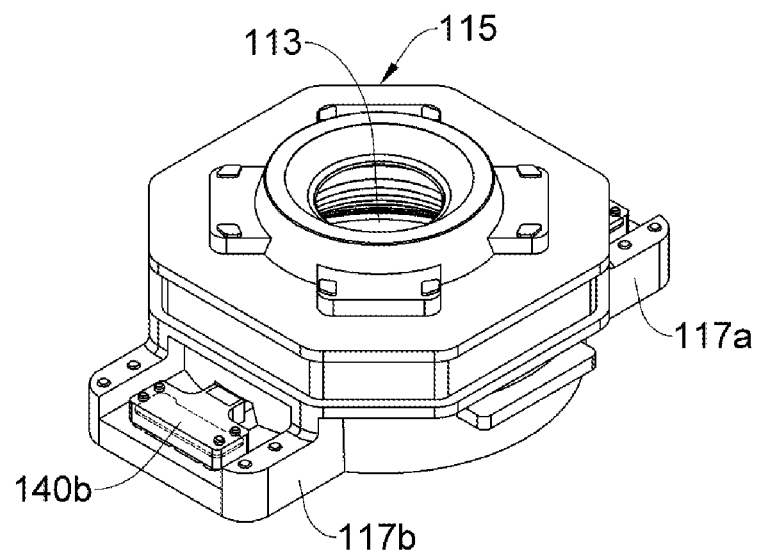
FIG. 3C is a perspective view of the carrier member which the second lens assembly group and the second coil member are mounted on according to the first embodiment of the present disclosure.
Figure 4A:
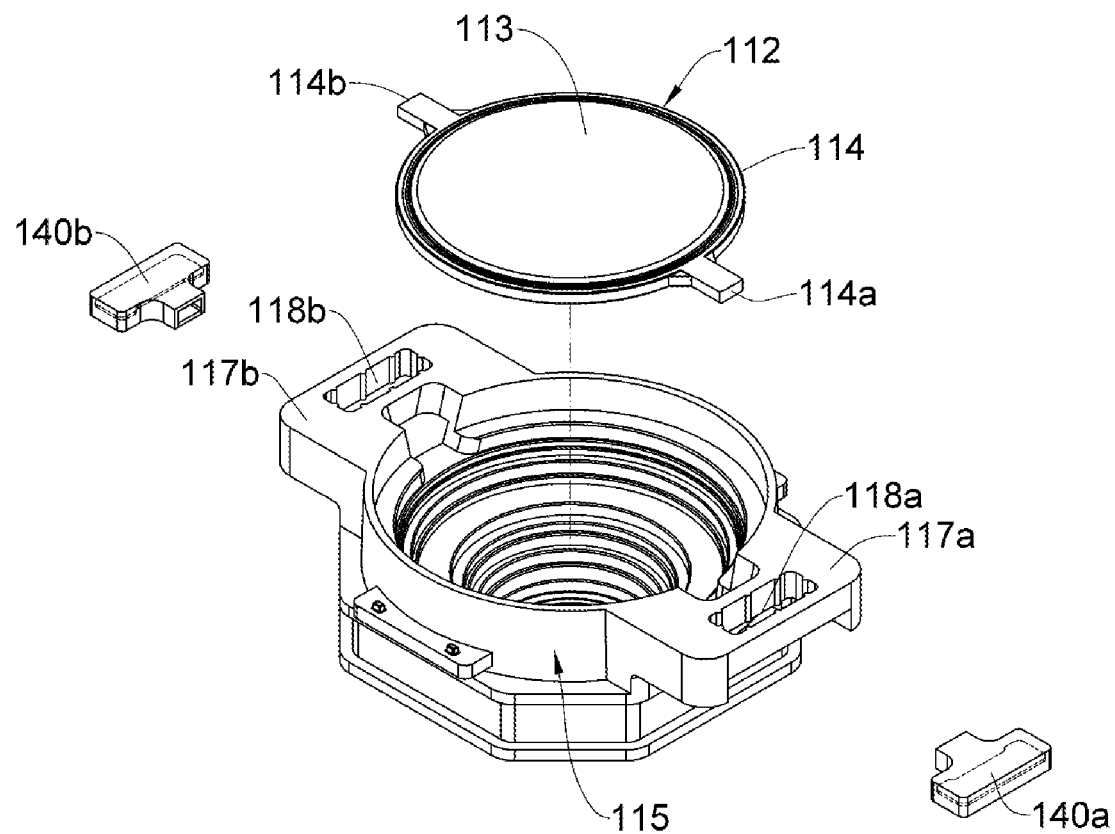
FIG. 4A is a schematic view of FIG. 3A turned upside down.
Figure 4B:
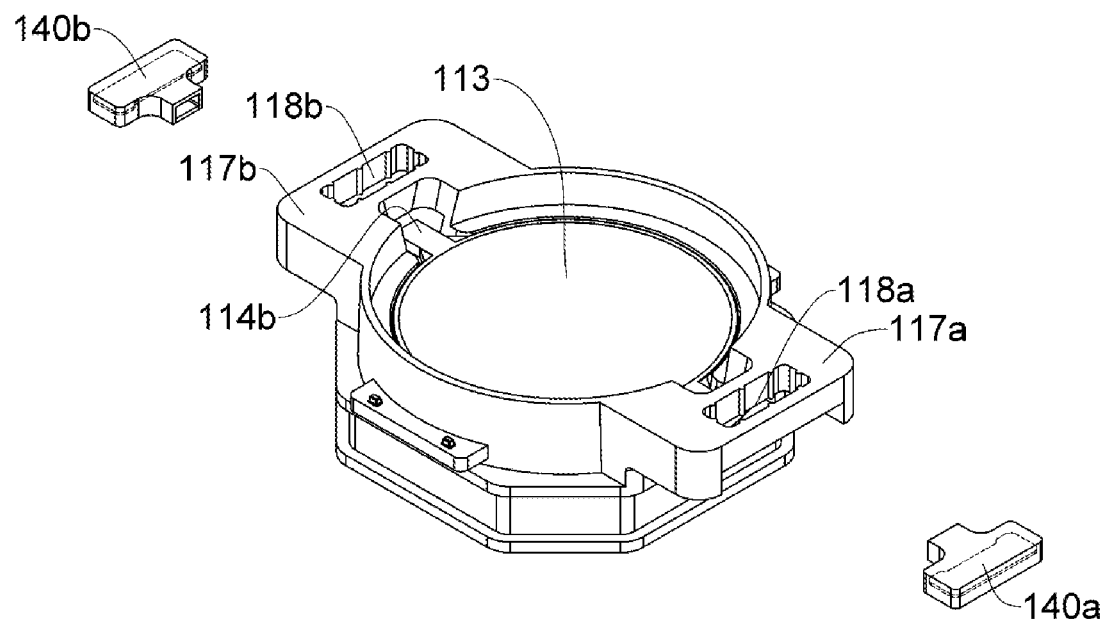
FIG. 4B is a schematic view of FIG. 3B turned upside down.
Figure 4C:
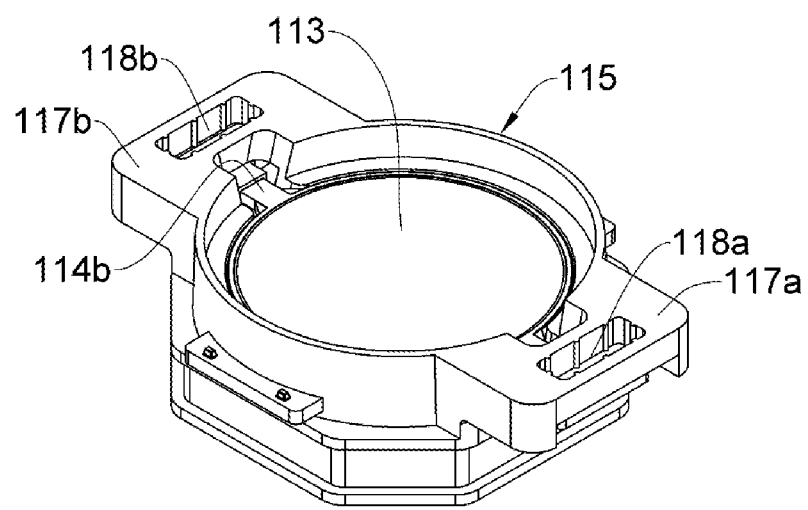
FIG. 4C is a schematic view of FIG. 3C turned upside down.

FIG. 1A is an exploded view of a lens assembly driving module according to the first embodiment of the present disclosure, with the object side at the top and the image side at the bottom. FIG. 1B is an exploded view of the lens assembly driving module according to the first embodiment of the present disclosure, with the image side at the top and the object side at the bottom. In the first embodiment, a lens assembly driving module 1 of the present disclosure comprises a photographing lens assembly 10, a first driving mechanism 12, and a second driving mechanism 14. The photographing lens assembly 10 has an optical axis OO and comprises a first lens assembly group 110, a second lens assembly group 112 and a carrier member 115. The first lens assembly group 110 comprises a first lens element 111a, a second lens element 111b, a third lens element 111c, a fourth lens element 111d, a fifth lens element 111e, a sixth lens element 111f and a seventh lens element 111g (shown in FIG. 8 and FIG. 9) sequentially in the order from the object side to the image side. The second lens assembly group 112 comprises an eighth lens element 113 and a lens element carrier 114. The lens element carrier 114 defines a receiving space for receiving the eighth lens element 113. A pair of protrusion portions 114a, 114b opposing each other are disposed at the outer rim of the lens element carrier 114 of the second lens assembly group 112, but the present disclosure is not limited thereto, the second lens assembly group 112 can only comprise an eighth lens element 113, a pair of protrusion portions 114a, 114b opposing each other are disposed at the outer rim of the eighth lens element 113 of the second lens assembly group 112. The carrier member 115 defines an internal space 116 which opens at two ends of an optical axis depicted by line OO. The carrier member 115 defines a plurality of annular support surfaces on the inner peripheral wall of the internal space 116 and parallel to the optical axis OO. The first lens assembly group 110 and the second lens assembly group 112 are disposed in the internal space 116 sequentially in the order from the object side to the image side, wherein the first lens assembly group 110 engages with the corresponding annular support surfaces, but the second lens assembly group 112 is not in physical contact with the corresponding annular support surfaces. Among the eight lens elements, the eighth lens element 113 is positioned closest to the image side in the photographing lens assembly 10. In an embodiment of the present disclosure, the carrier member 115 is an integrated design of integration of a lens barrel holder and a lens barrel and is effective in reducing the process steps required for automated assembly, reducing production cost, enhancing the manufacturing efficiency of injection molding, and reducing the likelihood of dust fall and assembly tilt which may otherwise occur to a conventional assembling process of individual parts and components. The lens assembly driving module 1 further comprises a casing 16 and a bottom base 18. An electronic photosensitive member (not shown) is mounted on the bottom base 18 and thus disposed on an imaging surface of the photographing lens assembly 10 to capture images of the object to be photographed. The photographing lens assembly 10 is mounted on the bottom base 18. The casing 16 serves as a cover for the photographing lens assembly 10 and is disposed above the bottom base 18. An opening 160 is disposed on a top surface of the casing 16 and extended along the optical axis OO, wherein the top surface faces the object side. Both the central axis of the opening 160 and the central axis of the internal space 116 of the carrier member 115 are aligned with the optical axis OO.

The first driving mechanism 12 comprises a first coil member 120 and first magnets 122a, 122b, 122c and 122d. The first coil member 120 is mounted on the outer rim of the carrier member 115. The lens assembly driving module 1 further comprises a first magnet holder 17 mounted on a second resilient member 145. The second resilient member 145 presses against a stepped portion 162 inside the casing 16. The first magnet holder 17 has four first magnet receiving portions 172a, 172b, 172c and 172d for holding the first magnets 122a, 122b, 122c and 122d, respectively, such that the first magnets 122a, 122b, 122c and 122d correspond in position to the first coil member 120.

The second driving mechanism 14 comprises a pair of second coil members 140a, 140b and a pair of second magnets 142a, 142b. The outer rim of the carrier member 115 protrudes outward to form second driving mechanism receiving portions 117a, 117b opposing each other and corresponding in position to the first coil member 120 from below. The second driving mechanism receiving portions 117a, 117b have second magnet receiving chambers 118a, 118b, respectively. The relationship between the second lens assembly group 112, second driving mechanism 14 and carrier member 115 is depicted by FIG. 2A, FIG. 2B, FIG. 3A, FIG. 3B, FIG. 3C, FIG. 4A, FIG. 4B and FIG. 4C and described below. FIG. 2A, FIG. 3A, FIG. 3B and FIG. 3C are perspective views and exploded views of the assembly process from the object side to the image side. FIG. 2B, FIG. 4A, FIG. 4B and FIG. 4C are perspective views of the assembly process from the image side to the object side. The pair of second magnets 142a, 142b of the second driving mechanism 14 are mounted in the second magnet receiving chambers 118a, 118b of the second driving mechanism receiving portions 117a, 117b of the carrier member 115, respectively. The second lens assembly group 112 is mounted in place inside the carrier member 115 and positioned proximate to the image side. The two protrusion portions 114a, 114b opposing each other and extending outward from the outer rim of the lens element carrier 114 or the eighth lens element 113 of the second lens assembly group 112 protrude outward from the rim of the carrier member 115. The second coil members 140a, 140b correspond in position to the second magnets 142a, 142b, are mounted on the second driving mechanism receiving portions 117a, 117b of the carrier member 115, and thus lie above the second magnets 142a, 142b, respectively. Furthermore, the second coil members 140a, 140b are mounted on the protrusion portions 114a, 114b of the lens element carrier 114 or the eighth lens element 113, respectively, for example, by dispensing and adhesion, but the present disclosure is not limited thereto.

Figure 5:
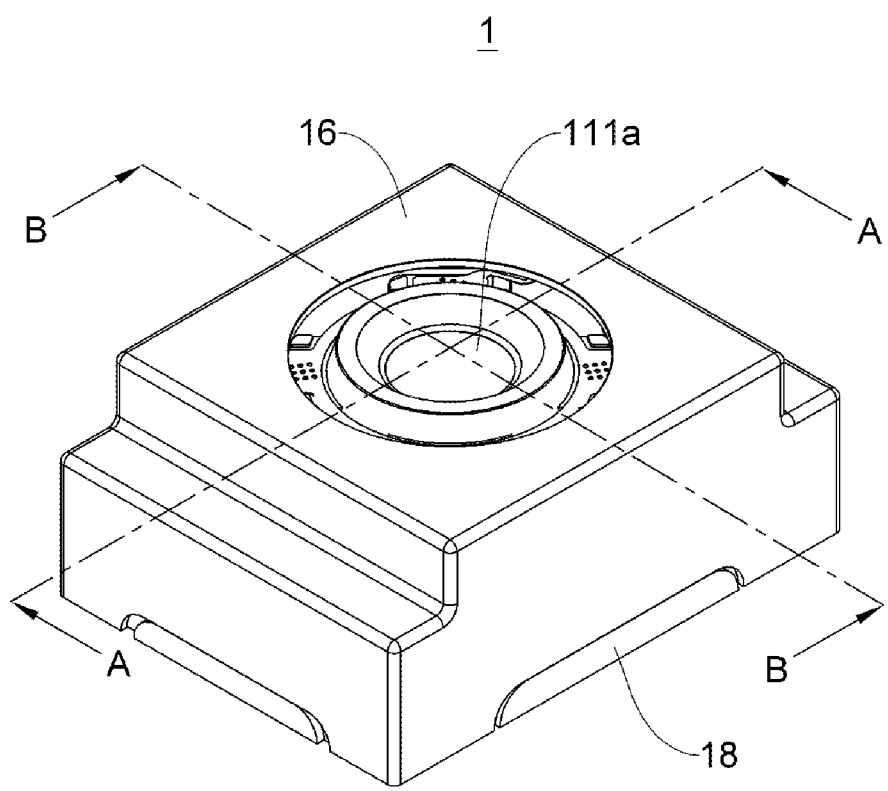
FIG. 5 is a perspective view of the assembled lens assembly driving module according to the first embodiment of the present disclosure.
Figure 6:
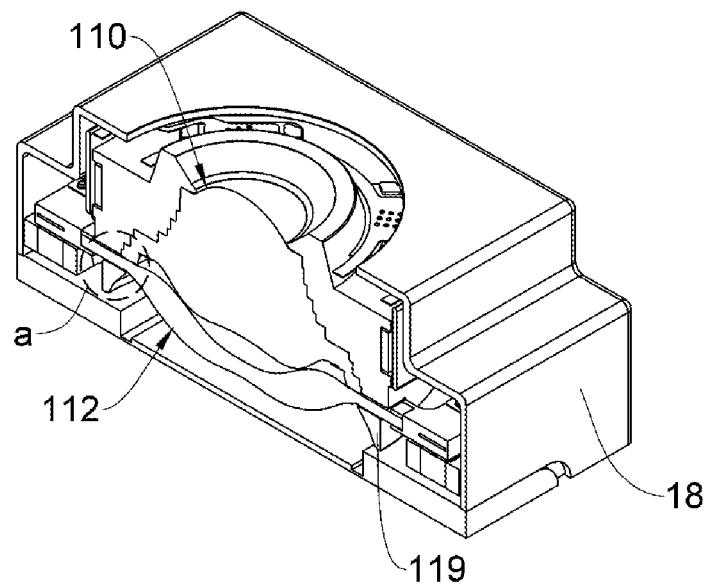
FIG. 6 is a cutaway view taken along line AA of FIG. 5.
Figure 6A:
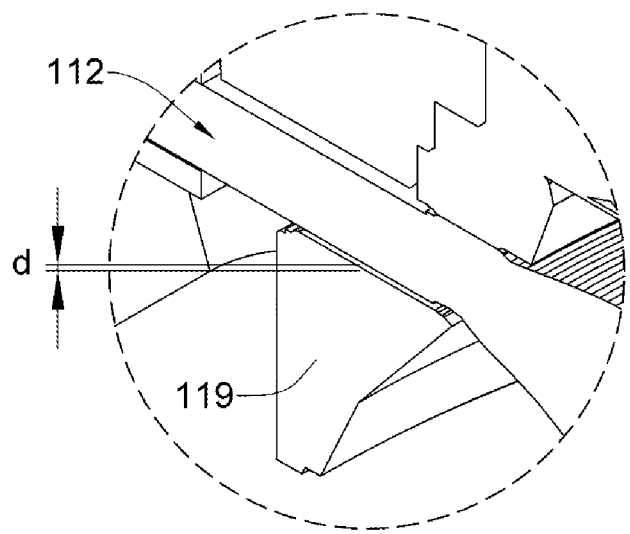
FIG. 6(a) is an enlarged view of part a shown in FIG. 6.
Figure 7:
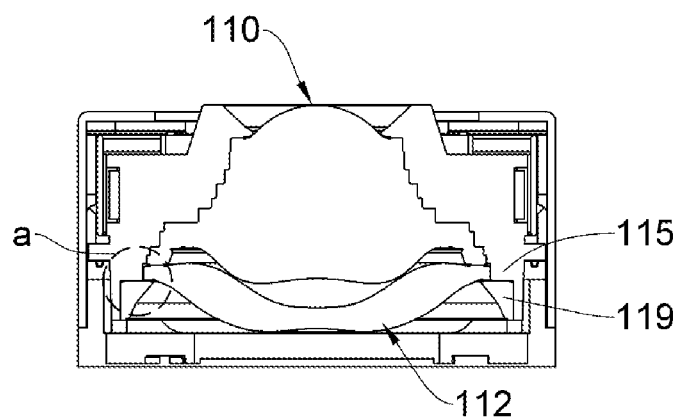
FIG. 7 is a cross-sectional view of the assembled lens assembly driving module according to the first embodiment of the present disclosure.
Figure 7A:
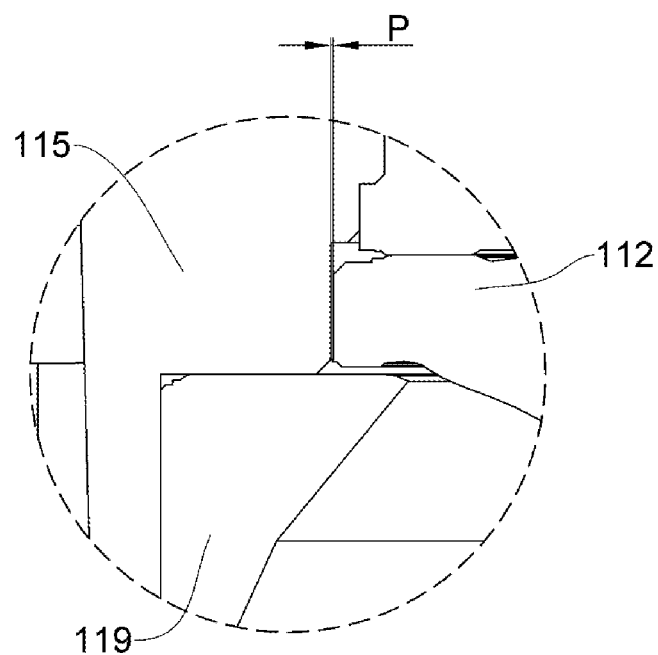
FIG. 7(a) is an enlarged view of part a shown in FIG. 7.

FIG. 5 is a perspective view of the assembled lens assembly driving module 1. FIG. 6 is a cutaway view taken along line AA of FIG. 5. FIG. 6(a) is an enlarged view of part a shown in FIG. 6. FIG. 7 is a cross-sectional view of the assembled lens assembly driving module 1. FIG. 7(a) is an enlarged view of part a shown in FIG. 7. Referring to FIG. 6(a), the eighth lens element 113 positioned in the second lens assembly group 112 is the lens element closest to the image side, and a first air clearance d is defined between the second lens assembly group 112 and a fixing ring 119. Referring to FIG. 7(a), a second air clearance P is defined between the second lens assembly group 112 and the annular support surfaces corresponding in position to the inner peripheral wall of the carrier member 115. Therefore, gaps are defined between the second lens assembly group 112, the annular support surfaces corresponding in position to the inner peripheral wall of the carrier member 115, and the fixing ring 119, such that the second lens assembly group 112 is not in physical contact with the carrier member 115, so as to provide the second driving mechanism with required driving distances.

The first driving mechanism 12 drives all the lens elements of the first lens assembly group 110 and all the lens elements of the second lens assembly group 112 to move along the optical axis OO, so as to calibrate central image quality. Therefore, the first driving mechanism 12 drives the photographing lens assembly 10 to perform focusing operation in long- and short-distance photography. The long-distance photography takes place when the distance between the object to be photographed and the photographing lens assembly 10 approximates to the infinite. The short-distance photography takes place when the distance between the object to be photographed and the photographing lens assembly 10 is less than 120 cm, or even 60, 30, 20, 10 cm, but the present disclosure is not limited thereto. The second driving mechanism 14 independently drives all the lens elements of the second lens assembly group 112 to move along the optical axis OO, so as to calibrate peripheral image quality, wherein the peripheral image quality is about the degree of the optical focusing of off-axis fields of view. The second driving mechanism 14 independently drives the eighth lens element 113 that is closest to the image side to move along the optical axis. In an embodiment of the present disclosure, the eighth lens element 113 is the plastic lens element. In an embodiment of the present disclosure, the eighth lens element 113 has a greater outer diameter than the other lens elements of the photographing lens assembly 10 to achieve satisfactory maximum optical corrections to fields of view. When the first driving mechanism 12 is operating, the distances between the lens elements of the photographing lens assembly 10 are invariable. By contrast, when the second driving mechanism 14 is operating, the distance between the eighth lens element 113 and the seventh lens element 111g, which are adjacent to each other, is variable. Therefore, the second driving mechanism 14 causes the seventh lens element 111g and the eighth lens element 113 of the photographing lens assembly 10 to move relative to each other along the optical axis.

In an embodiment of the present disclosure, the first driving mechanism 12 drives the second driving mechanism 14 to move along the optical axis OO, and the second driving mechanism 14 is a solenoid valve, but the present disclosure is not limited thereto. Therefore, the first driving mechanism 12 and the second driving mechanism 14 cause the seventh lens element 111g and the eighth lens element 113 of the photographing lens assembly 10 to move relative to each other along the optical axis.

Figure 8:
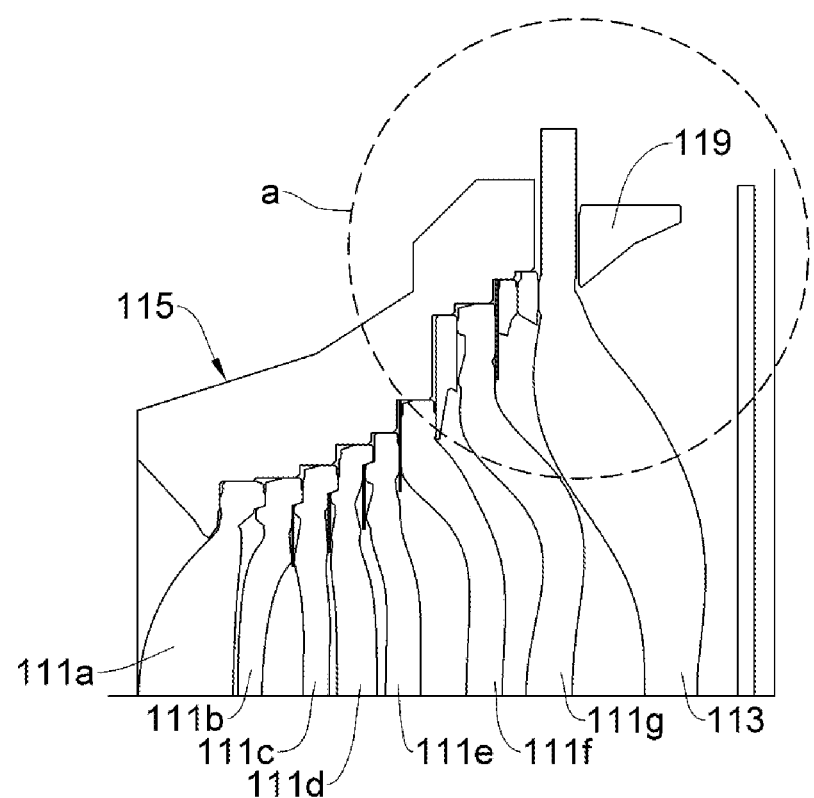
FIG. 8 is a cross-sectional view of a photographing lens assembly taken along line AA of FIG. 5.
Figure 8A:
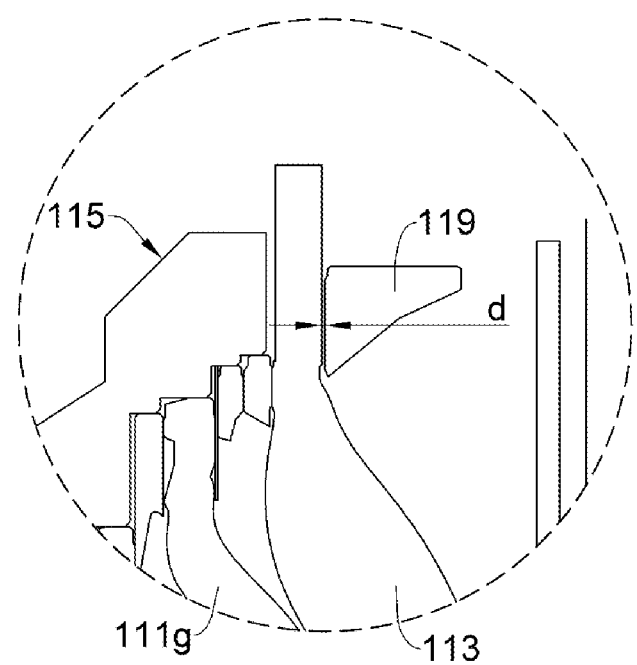
FIG. 8(a) is an enlarged view of part a shown in FIG. 8.
Figure 9:
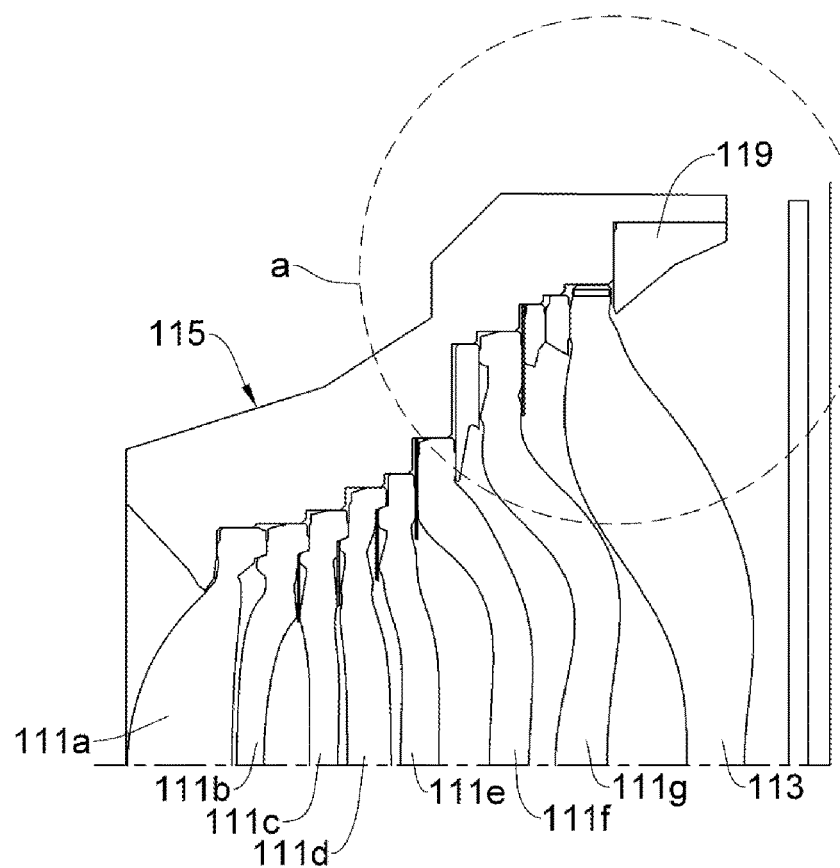
FIG. 9 is a cross-sectional view of the photographing lens assembly taken along line BB of FIG. 5.
Figure 9A:
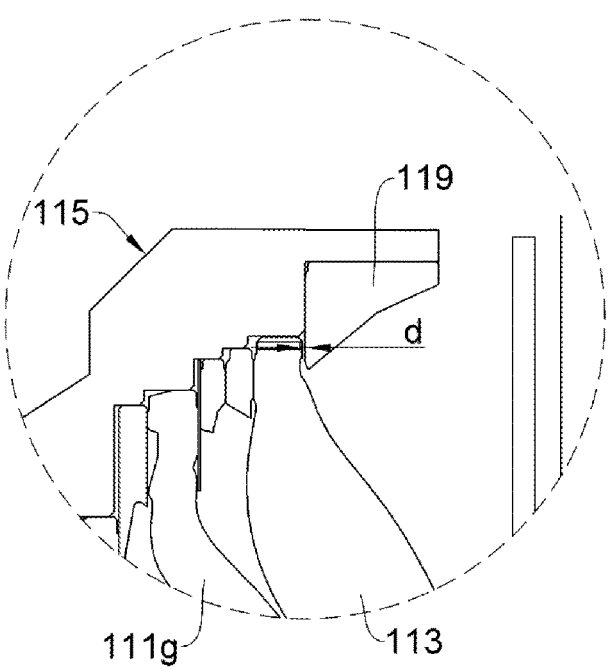
FIG. 9(a) is an enlarged view of part a shown in FIG. 9.

FIG. 8 is a partial cross-sectional view taken along line AA of FIG. 5. FIG. 8(a) is an enlarged view of part a shown in FIG. 8. FIG. 9 is a partial cross-sectional view taken along line BB of FIG. 5. FIG. 9(a) is an enlarged view of part a shown in FIG. 9. The diagrams show that the displacement of the eighth lens element 113 moving along the optical axis when driven by the second driving mechanism 14 is denoted by d. In an embodiment of the present disclosure, d is 0.03 mm. When the first driving mechanism 12 is operating, the distances between the lens elements of the photographing lens assembly 10 are invariable. By contrast, when the second driving mechanism 14 is operating, the distance between the eighth lens element 113 and the seventh lens element 111g, which are adjacent to each other, is variable. Table 1 below enumerates the displacement of the first lens assembly group 110 under the operation of the first driving mechanism 12 and the displacement of the second lens assembly group 112 under the operation of the second driving mechanism 14, given different object distances. The object distances are the distances between the object and the photographing lens assembly 10.

TABLE 1

| Object distance | First lens assembly group displacement | Second lens assembly group displacement |
| --- | --- | --- |
| Infinite | 0.000 mm | 0.000 mm |
| 1 m | 0.044 mm | 0.044 mm |
| 67 cm | 0.066 mm | 0.066 mm |
| 50 cm | 0.074 mm | 0.044 mm |
| 30 cm | 0.135 mm | 0.105 mm |
| 20 cm | 0.215 mm | 0.185 mm |

In an embodiment of the present disclosure, only the relative distance along the optical axis of the seventh lens element 111g and the eighth lens element 113, which are adjacent to each other, in the photographing lens assembly 10 is variable, so as to maximize independent optimization capability for local fields of view.

In an embodiment of the present disclosure, the second driving mechanism 14 further comprises a preload mechanism (preload structure). The preload mechanism generates a preload force between adjacent lens elements, such that one of the adjacent lens elements moves toward the other lens element along the optical axis OO under the preload force, so as to effectively ensure optical precision of optical lens spacing. Referring to FIG. 1A and FIG. 1B, in an embodiment of the present disclosure, the preload mechanism is a first resilient member 143. The second driving mechanism 14 further comprises the first resilient member 143. The first resilient member 143 is fitted between the bottom base 18 and the carrier member 115. The peripheral end portions 143a, 143b, 143c, 143d of the first resilient member 143 are connected to top peripheral end portions 182, 184, 186, 188 of the bottom base 18, respectively. Extension portions 144a, 144b, 144c, 144d are disposed at the peripheral end portions 143a, 143b, 143c, 143d of the first resilient member 143. The opposing ends of the extension portions 144a, 144b, 144c, 144d, which are opposite the peripheral end portions 143a, 143b, 143c, 143d, are connected to the second coil members 140a, 140b, respectively. Therefore, the first resilient member 143 generates a preload force between the eighth lens element 113 and the seventh lens element 111g which are adjacent to each other, such that the eighth lens element 113 moves along the optical axis OO toward the seventh lens element 111g to ensure optical precision of optical lens spacing and maintain the optical axis collimation uniformity between the adjacent lens elements. In an embodiment of the present disclosure, the first resilient member 143 is sheet-shaped, but the present disclosure is not limited thereto.

In an embodiment of the present disclosure, the lens assembly driving module 1 comprises a second resilient member 145. Referring to FIG. 1A and FIG. 1B, the second resilient member 145 is fitted between the casing 16 and the photographing lens assembly 10. Peripheral end portions 145a, 145b, 145c, 145d of the second resilient member 145 are connected to the casing 16. Extension portions 146a, 146b, 146c, 146d are disposed at the peripheral end portions 145a, 145b, 145c, 145d of the second resilient member 145.

The extension portions 146a, 146b, 146c, 146d are each connected to the photographing lens assembly 10. Therefore, the second resilient member 145 provides a position restoration mechanism to the photographing lens assembly 10.

Second Embodiment

Figure 10A:
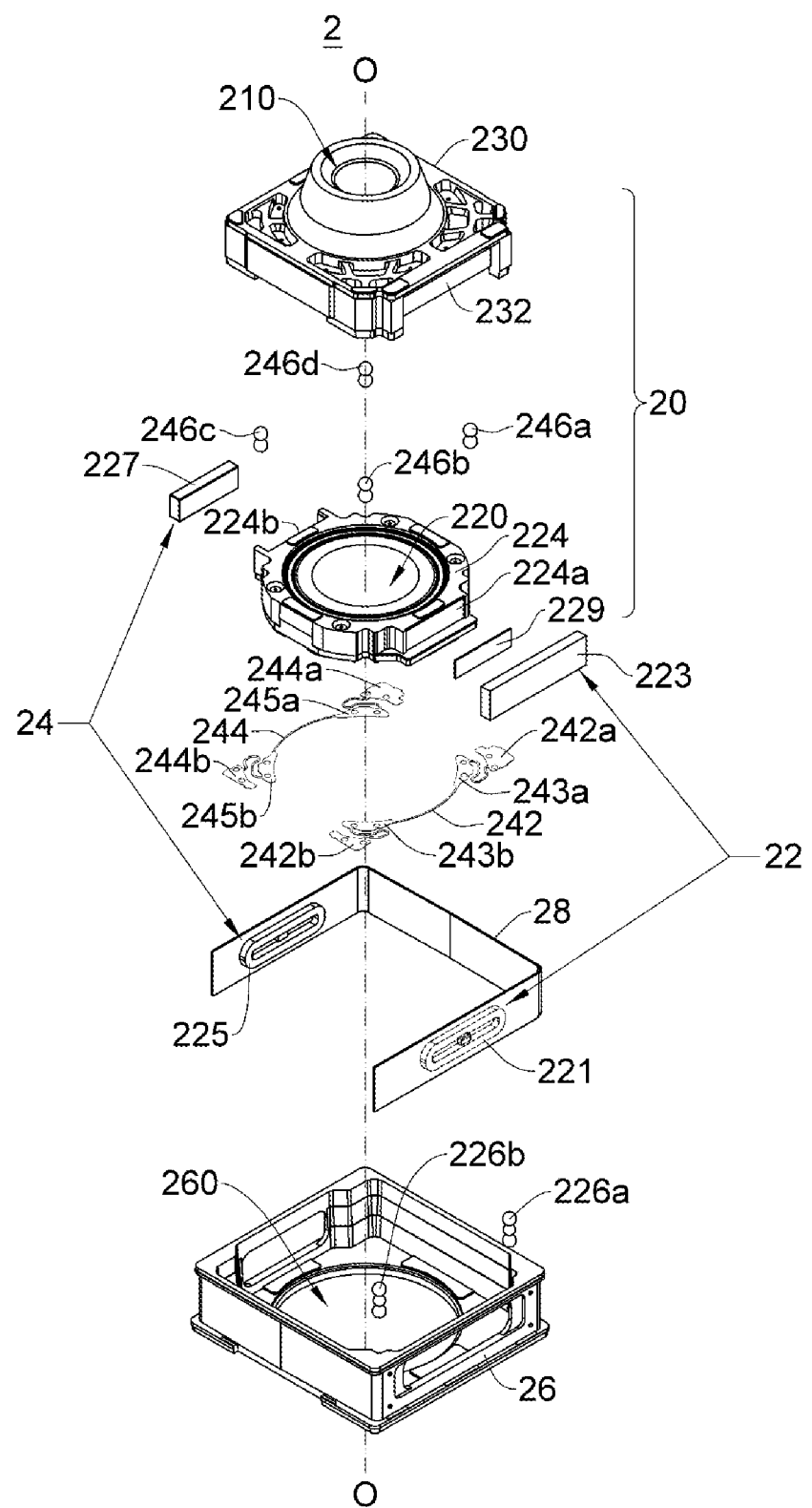
FIG. 10A is an exploded view of a lens assembly driving module according to a second embodiment of the present disclosure, with the object side at the top and the image side at the bottom.
Figure 10B:
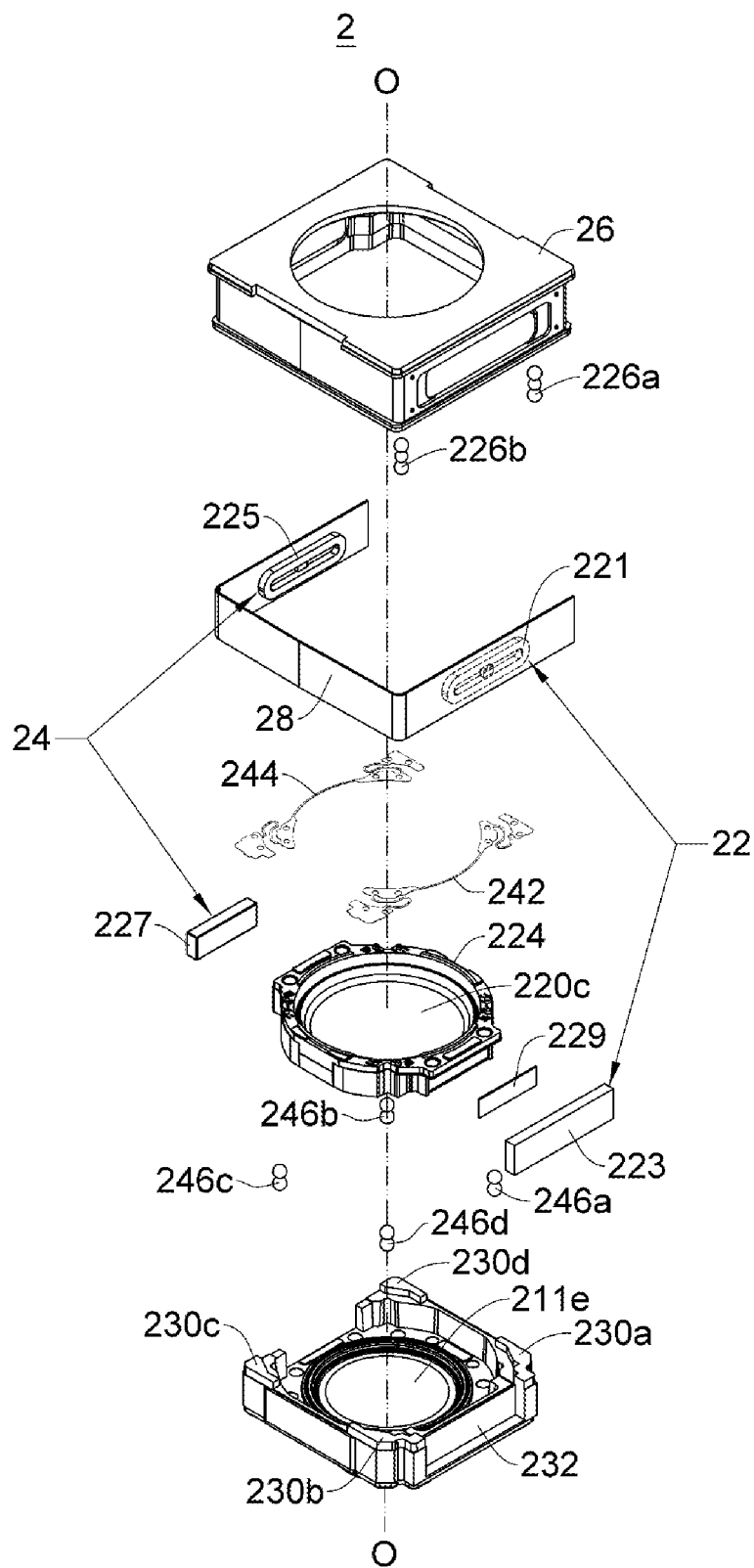
FIG. 10B is an exploded view of the lens assembly driving module according to the second embodiment of the present disclosure, with the image side at the top and the object side at the bottom.
Figure 12:
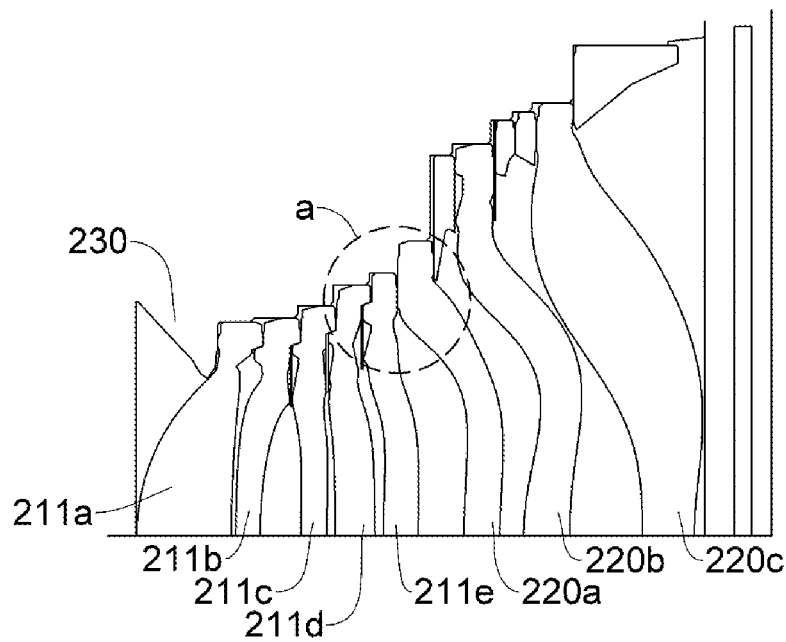
FIG. 12 is a partial cross-sectional view of the photographing lens assembly taken along line AA of FIG. 11.

FIG. 10A is an exploded view of a lens assembly driving module according to the second embodiment of the present disclosure, with the object side at the top and the image side at the bottom. FIG. 10B is an exploded view of the lens assembly driving module according to the second embodiment of the present disclosure, with the image side at the top and the object side at the bottom. In the second embodiment, a lens assembly driving module 2 of the present disclosure comprises a photographing lens assembly 20, a first driving mechanism 22, and a second driving mechanism 24. The photographing lens assembly 20 has an optical axis OO and comprises a first lens assembly group 210, a second lens assembly group 220 and a carrier member 230. Referring to FIG. 12, the first lens assembly group 210 comprises a first lens element 211a, second lens element 211b, third lens element 211c, fourth lens element 211d and fifth lens element 211e sequentially in the order from the object side to the image side. The first lens element 211a, second lens element 211b, third lens element 211c, fourth lens element 211d and fifth lens element 211e are received in an internal receiving space of the carrier member 230 and are in physical contact with the carrier member 230. The second lens assembly group 220 comprises the sixth lens element 220a, the seventh lens element 220b, the eighth lens element 220c and a lens element carrier 224 sequentially in the order from the object side to the image side. One of the sixth lens element 220a, the seventh lens element 220b and the eighth lens element 220c is a plastic lens element. The lens element carrier 224 has a receiving space for receiving the sixth lens element 220a, the seventh lens element 220b and the eighth lens element 220c in such a manner that the lens elements are in physical contact with the lens element carrier 224. The lens element carrier 224 is received in the internal receiving space of the carrier member 230, such that the second lens assembly group 220 is fitted to the first lens assembly group 210 from behind sequentially in the order from the object side to the image side. A clearance is defined between the fifth lens element 211e of the first lens assembly group 210 and the sixth lens element 220a of the second lens assembly group 220. In an embodiment of the present disclosure, the carrier member 230 is an integrated design of integration of a lens barrel holder and a lens barrel. The lens assembly driving module 2 further comprises a holder 26. The holder 26 defines an internal space 260. The carrier member 230 is fitted to the internal space 260. The electronic photosensitive member (not shown) is mounted on the holder 26 and corresponds in position to an imaging surface of the photographing lens assembly 20 to capture images of the object to be photographed. Both the central axis of the carrier member 230 and the central axis of the lens element carrier 224 are aligned with the optical axis OO of the photographing lens assembly 20.

The first driving mechanism 22 comprises a first coil member 221 and a first magnet 223. The first coil member 221 is mounted on a first inner side of a U-shaped coil carrier component 28. The U-shaped coil carrier component 28 is mounted on the outer edge of the holder 26. The first magnet 223 is mounted on a first magnet receiving portion 232 on the outer side of the carrier member 230 and corresponds in position to the first coil member 221. The first driving mechanism 22 further comprises an auxiliary magnetic member 229 received in a magnetic member receiving chamber 224a on the outer side of the lens element carrier 224 of the second lens assembly group 220. The auxiliary magnetic member 229, the first magnet 223 and the first coil member 221 correspond in position to one another.

The second driving mechanism 24 comprises a second coil member 225 and a second magnet 227. The second coil member 225 is mounted on a second inner side of the U-shaped coil carrier component 28. The first and second inner sides of the U-shaped coil carrier component 28 oppose each other. The second magnet 227 is disposed in a second magnet receiving chamber 224b on the outer side of the lens element carrier 224 of the second lens assembly group 220 and corresponds in position to the second coil member 225. The second magnet receiving chamber 224b is opposite the magnetic member receiving chamber 224a.

Figure 11:
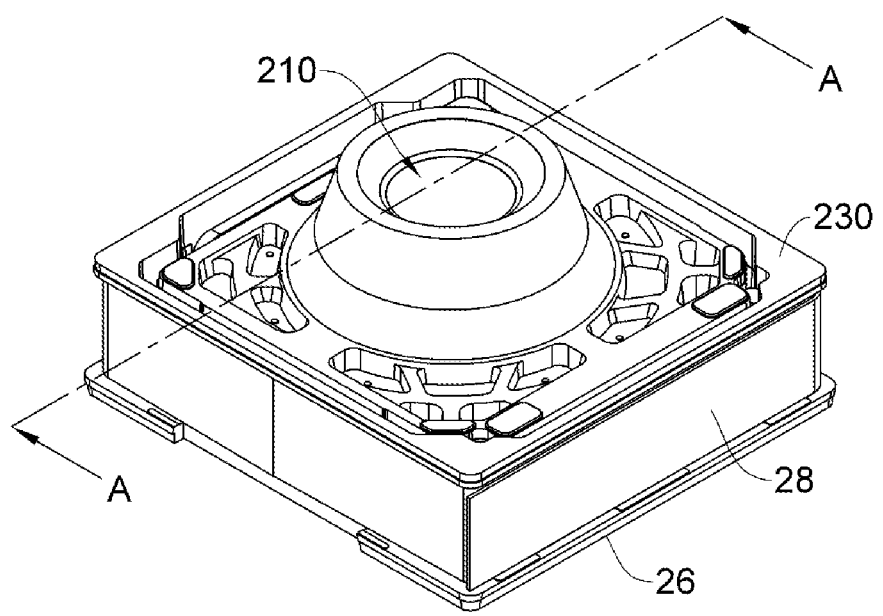
FIG. 11 is a perspective view of the assembled lens assembly driving module according to the second embodiment of the present disclosure.
Figure 12A:
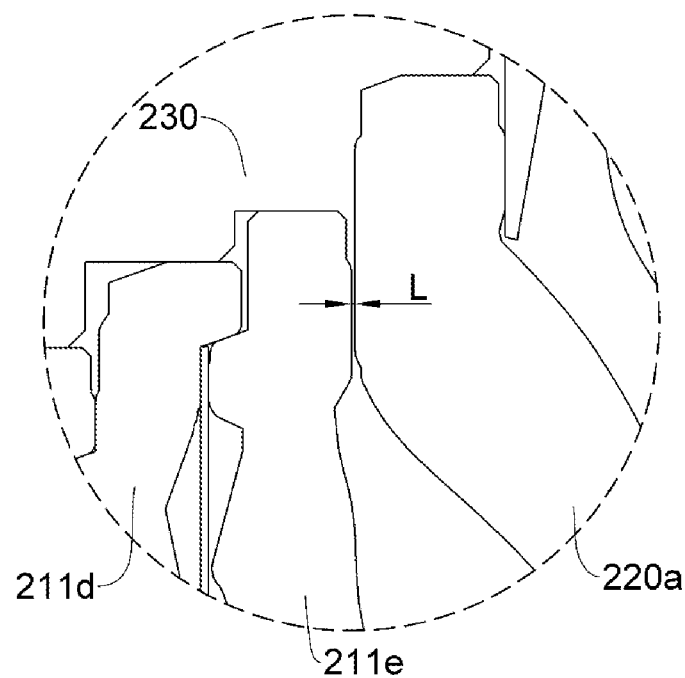
FIG. 12(a) is an enlarged view of part a shown in FIG. 12.

FIG. 11 is a perspective view of the assembled lens assembly driving module 2. FIG. 12 is a cross-sectional view taken along line AA of FIG. 11. FIG. 12(a) is an enlarged view of part a shown in FIG. 12. In an embodiment of the present disclosure, a clearance L is defined between the fifth lens element 211e of the first lens assembly group 210 and the sixth lens element 220a of the second lens assembly group 220. In an embodiment of the present disclosure, the clearance L is equal to 0.01 mm.

The first driving mechanism 22 drives all the lens elements of the first lens assembly group 210 and all the lens elements of the second lens assembly group 220 to move along the optical axis OO, so as to calibrate central image quality. Therefore, the first driving mechanism 22 drives the photographing lens assembly 20 to perform focusing operation in long- and short-distance photography. The long-distance photography takes place when the distance between the object to be photographed and the photographing lens assembly 20 approximates to the infinite. The short-distance photography takes place when the distance between the object to be photographed and the photographing lens assembly 20 is less than 120 cm, or even 60, 30, 20, 10 cm, but the present disclosure is not limited thereto. The second driving mechanism 24 independently drives all the lens elements of the second lens assembly group 220 to move along the optical axis OO, so as to calibrate peripheral image quality, wherein the peripheral image quality is about the image curvature of off-axis fields of view. In an embodiment of the present disclosure, the plastic lens element in the second lens assembly group 220 has a greatest outer diameter among the lens elements in the first lens assembly group 210 and the second lens assembly group 220 to achieve satisfactory maximum optical corrections to fields of view. Referring to FIG. 12(a), the displacement of the second lens assembly group 220 moving along the optical axis OO when driven by the second driving mechanism 24 is denoted by L. In an embodiment of the present disclosure, L is 0.01 mm. In an embodiment of the present disclosure, only the relative distance along the optical axis of the fifth lens element 211e and the sixth lens element 220a, which are adjacent to each other, in the photographing lens assembly 20 is variable, so as to maximize independent optimization capability for local fields of view. Therefore, when the first driving mechanism 22 is operating, the distances between the lens elements of the photographing lens assembly 20 are invariable. By contrast, when the second driving mechanism 24 is operating, the distance between the sixth lens element 220a and the fifth lens element 211e, which are adjacent to each other, is variable. Table 2 below enumerates the displacement of the first lens assembly group 210 under the operation of the first driving mechanism 22 and the displacement of the second lens assembly group 220 under the operation of the second driving mechanism 24, given different object distances. The object distances are the distances between the object and the photographing lens assembly 20.

TABLE 2

| Object distance | First lens assembly group displacement | Second lens assembly group displacement |
| --- | --- | --- |
| Infinite | 0.000 mm | 0.000 mm |
| 1 m | 0.044 mm | 0.044 mm |
| 67 cm | 0.066 mm | 0.066 mm |
| 50 cm | 0.088 mm | 0.078 mm |
| 30 cm | 0.150 mm | 0.140 mm |
| 20 cm | 0.230 mm | 0.220 mm |

In an embodiment of the present disclosure, the first driving mechanism 22 drives the second driving mechanism 24 to move along the optical axis OO, and the second driving mechanism 24 is a solenoid valve, but the present disclosure is not limited thereto. Therefore, the first driving mechanism 22 and second driving mechanism 24 cause the relative distance along the optical axis of the fifth lens element 211e and the sixth lens element 220a, which are adjacent to each other, of the photographing lens assembly 20 vary.

In an embodiment of the present disclosure, the second driving mechanism 24 further comprises a preload mechanism (preload structure). The preload mechanism generates a preload force between adjacent lens elements, such that one of the adjacent lens elements moves along the optical axis OO toward the other lens element, so as to effectively ensure optical precision of optical lens spacing. Referring to FIG. 10A and FIG. 10B, in an embodiment of the present disclosure, the preload mechanism is resilient members 242, 244. The second driving mechanism 24 further comprises the resilient members 242, 244. The outer ends 242a, 242b, 244a, 244b of the resilient members 242, 244 are connected to peripheral end portions 230a, 230b, 230c, 230d at the bottom of the carrier member 230, respectively, as shown in FIG. 10D. Inner ends 243a, 243b, 245a, 245b of the resilient members 242, 244 are connected to the lens element carrier 224 of the second lens assembly group 220, respectively. Therefore, the resilient members 242, 244 generate a preload force between the first lens assembly group 210 and the second lens assembly group 220, such that the second lens assembly group 220 moves along the optical axis OO toward the first lens assembly group 210, so as to ensure optical precision of optical lens spacing and maintain the optical axis collimation uniformity between the fifth lens element 211e and the sixth lens element 220a, which are adjacent to each other. In an embodiment of the present disclosure, the resilient members 242, 244 are sheet-shaped, but the present disclosure is not limited thereto.

Figure 10C:
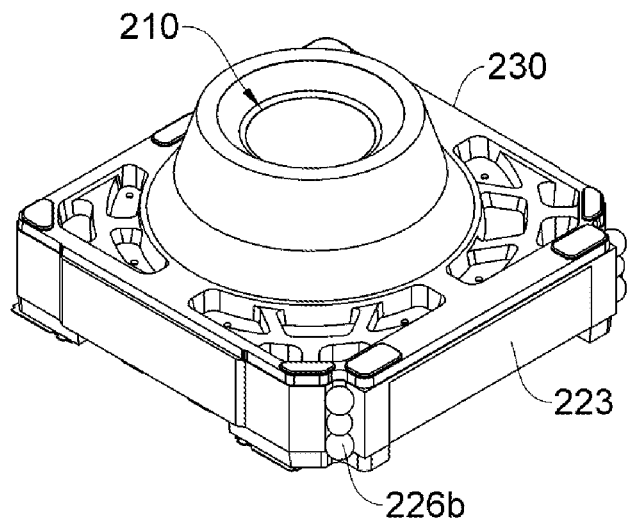
FIG. 10C is a perspective view of a photographing lens assembly which a resilient member is mounted on according to the second embodiment of the present disclosure.
Figure 10D:
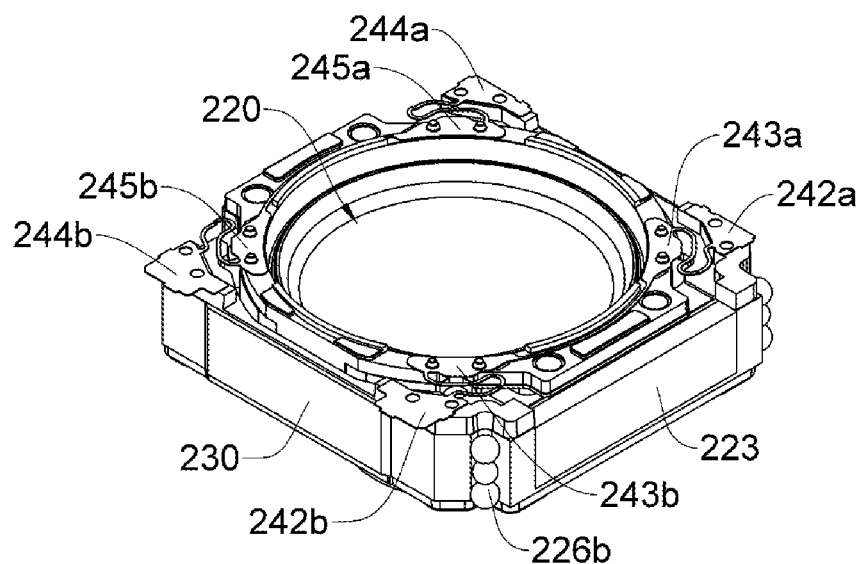
FIG. 10D is a perspective view of the photographing lens assembly shown in FIG. 10C, equipped with the resilient member and turned upside down in FIG. 10D.

Referring to FIG. 10A and FIG. 10C, in an embodiment of the present disclosure, the first driving mechanism 22 further comprises rolling members 226a, 226b. The rolling members 226a, 226b are fitted between the carrier member 230 and the holder 26 to increase degrees of freedom of the first lens assembly group 210 and the second lens assembly group 220 in moving along the optical axis OO. In an embodiment of the present disclosure, the second driving mechanism 24 further comprises rolling members 246a, 246b, 246c, 246d. The rolling members 246a, 246b, 246c, 246d are fitted between the carrier member 230 and the second lens assembly group 220 to increase degrees of freedom of the second lens assembly group 220 in moving along the optical axis OO.

Third Embodiment

Figure 13A:
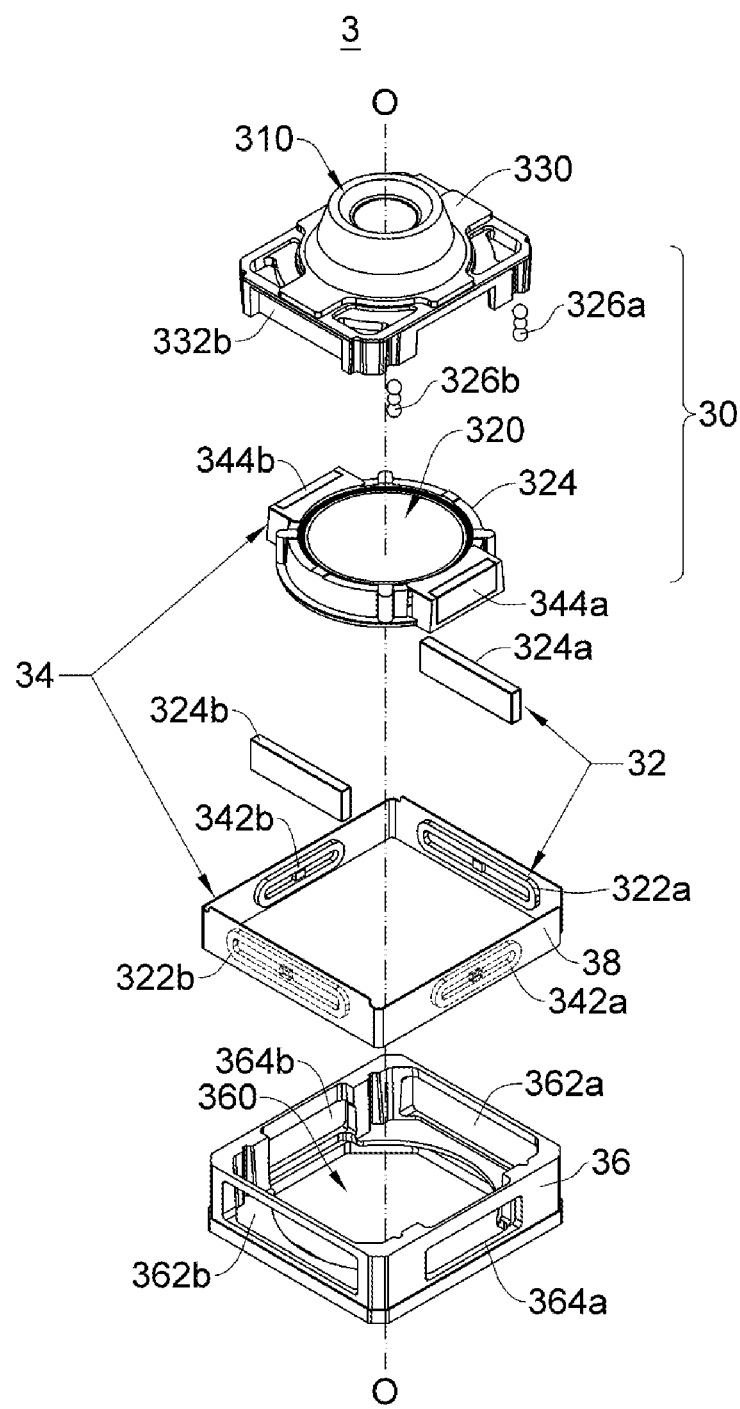
FIG. 13A is an exploded view of a lens assembly driving module according to a third embodiment of the present disclosure, with the object side at the top and the image side at the bottom.
Figure 13B:
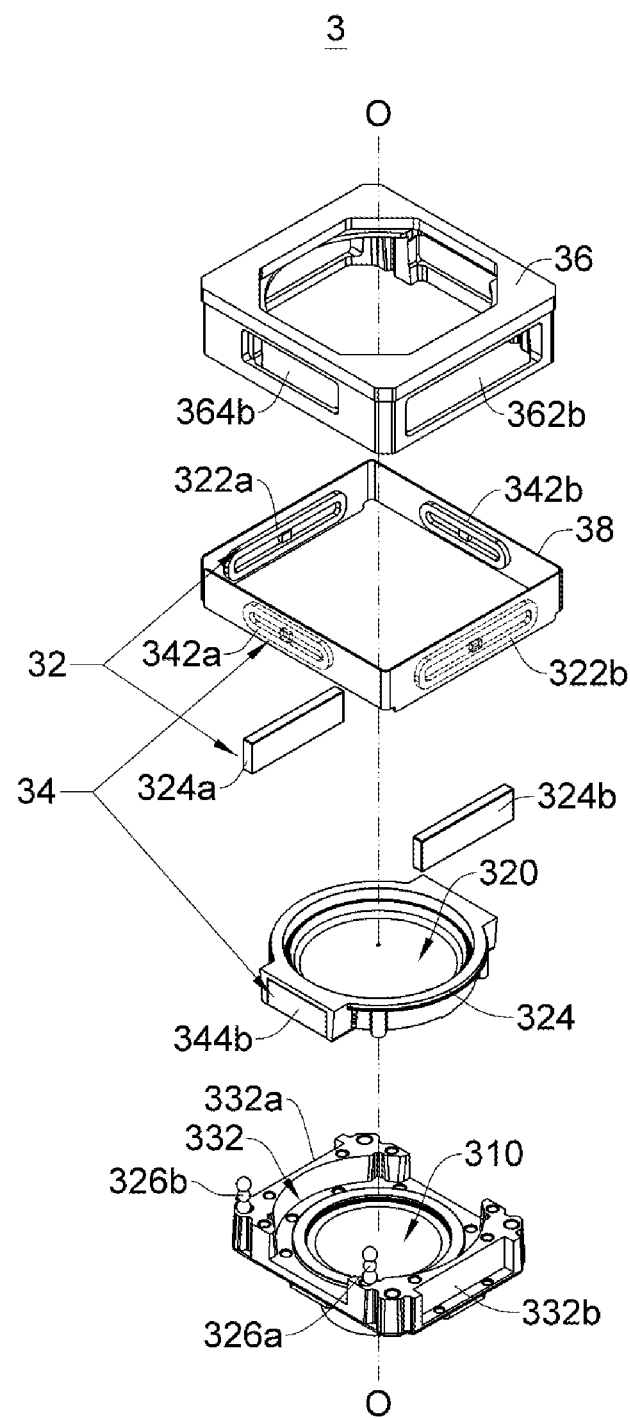
FIG. 13B is an exploded view of the lens assembly driving module according to the third embodiment of the present disclosure, with the image side at the top and the object side at the bottom.

FIG. 13A is an exploded view of a lens assembly driving module according to the third embodiment of the present disclosure, with the object side at the top and the image side at the bottom. FIG. 13B is an exploded view of the lens assembly driving module according to the third embodiment of the present disclosure, with the image side at the top and the object side at the bottom. In the third embodiment, a lens assembly driving module 3 of the present disclosure comprises a photographing lens assembly 30, a first driving mechanism 32, and a second driving mechanism 34. The photographing lens assembly 30 has an optical axis OO and comprises a first lens assembly group 310, a second lens assembly group 320 and a carrier member 330. The first lens assembly group 310 comprises a plurality of lens elements. The first lens assembly group 310 is received in an internal receiving space 332 of the carrier member 330 and is in physical contact with the carrier member 330. The second lens assembly group 320 comprises a plurality of lens elements and a lens element carrier 324 sequentially in the order from the object side to the image side. The second lens assembly group 320 comprises a plastic lens element. The lens element carrier 324 has a receiving space for receiving the lens elements, and the lens elements are in physical contact with the lens element carrier 324. The lens element carrier 324 is received in the internal receiving space 332 of the carrier member 330, such that the second lens assembly group 320 is fitted to the first lens assembly group 310 from behind sequentially in the order from the object side to the image side. A clearance is defined between adjacent lens elements of the first lens assembly group 310 and the second lens assembly group 320. In an embodiment of the present disclosure, the carrier member 330 is an integrated design of integration of the lens barrel holder and the lens barrel. The lens assembly driving module 3 further comprises a holder 36. The holder 36 defines an internal space 360, and the carrier member 330 is fitted to the internal space 360. The electronic photosensitive member (not shown) is mounted on the holder 36 and corresponds in position to an imaging surface of the photographing lens assembly 30 to capture images of the object to be photographed. Both the central axis of the carrier member 330 and the central axis of the lens element carrier 324 are aligned with the optical axis OO of the photographing lens assembly 30.

The first driving mechanism 32 comprises a pair of first coil members 322a, 322b and a pair of first magnets 324a, 324b. The first coil members 322a, 322b are mounted on a pair of first inner sides opposing a coil carrier component 38. The coil carrier component 38 is mounted on the outer edge of the holder 36, such that the first coil members 322a, 322b are inserted into slots 362a, 362b corresponding in position to the outer edge of the holder 36. The first magnets 324a, 324b are not only received in a pair of first magnet receiving portions 332a, 332b opposing each other and disposed on the outer side of the carrier member 330, respectively, but also correspond in position to the first coil members 322a, 322b.

The second driving mechanism 34 comprises a pair of second coil members 342a, 342b and a pair of second magnets 344a, 344b. The second coil members 342a, 342b are mounted on a pair of opposing second inner sides of the coil carrier component 38, respectively. The second coil members 342a, 342b are inserted into slots 364a, 364b corresponding in position to the outer edge of the holder 36, respectively. The second magnets 344a, 344b are not only received in a pair of second magnet receiving chambers opposing each other and disposed on the outer side of the lens element carrier 324 of the second lens assembly group 320, respectively, but also correspond in position to the second coil members 342a, 342b.

In an embodiment of the present disclosure, a clearance is defined between adjacent lens elements of the first lens assembly group 310 and the second lens assembly group 320 to provide the first and second driving mechanisms with required driving distances.

The first driving mechanism 32 drives all the lens elements of the first lens assembly group 310 and all the lens elements of the second lens assembly group 320 to move along the optical axis OO, so as to calibrate central image quality. Therefore, the first driving mechanism 32 drives the photographing lens assembly 30 to perform focusing operation in long- and short-distance photography. The long-distance photography takes place when the distance between the object to be photographed and the photographing lens assembly 30 approximates to the infinite. The short-distance photography takes place when the distance between the object to be photographed and the photographing lens assembly 30 is less than 120 cm, or even 60, 30, 20, 10 cm, but the present disclosure is not limited thereto. The second driving mechanism 34 independently drives all the lens elements of the second lens assembly group 320 to move along the optical axis OO, thereby calibrating peripheral image quality. The peripheral image quality is about the focusing image resolution of off-axis fields of view. In an embodiment of the present disclosure, the plastic lens element in the second lens assembly group 320 has a greatest outer diameter among the lens elements in the first lens assembly group 310 and the second lens assembly group 320, so as to achieve satisfactory maximum optical corrections to fields of view. In an embodiment of the present disclosure, the second driving mechanism 34 causes the relative distance along the optical axis of adjacent lens elements of the first lens assembly group 310 and the second lens assembly group 320 to vary.

In an embodiment of the present disclosure, the first driving mechanism 32 drives the second driving mechanism 34 to move along the optical axis OO, and the second driving mechanism 34 is a solenoid valve, but the present disclosure is not limited thereto. Therefore, the first driving mechanism 32 and the second driving mechanism 34 cause the relative distance along the optical axis of adjacent lens elements of the first lens assembly group 310 and the second lens assembly group 320 to vary.

In an embodiment of the present disclosure, the first driving mechanism 32 further comprises rolling members 326a, 326b. The rolling members 326a, 326b are fitted between the carrier member 330 and the holder 36 to provide degree of freedoms to the first driving mechanism 32 in driving all the lens elements to move along the optical axis OO.

Figure 14:
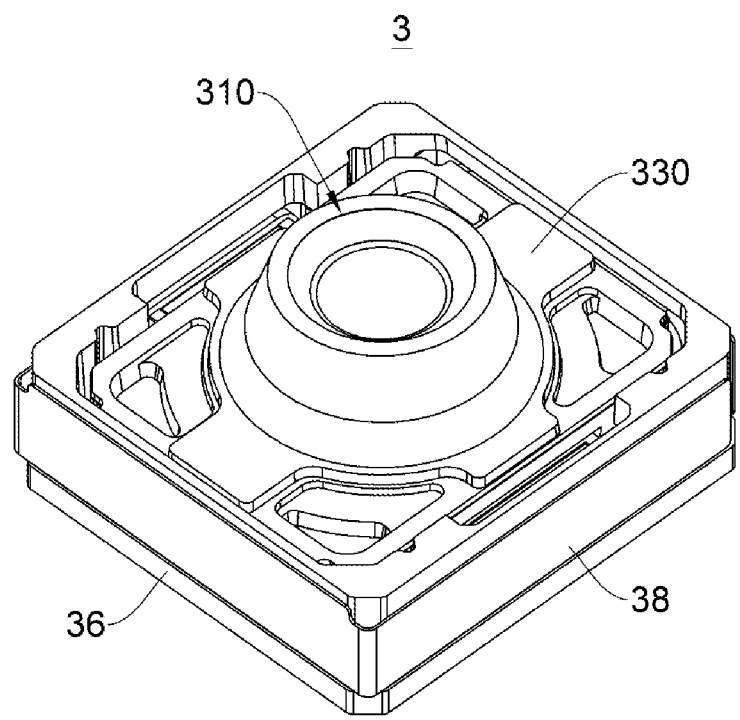
FIG. 14 is a perspective view of the assembled lens assembly driving module according to the third embodiment of the present disclosure.
Figure 14A:
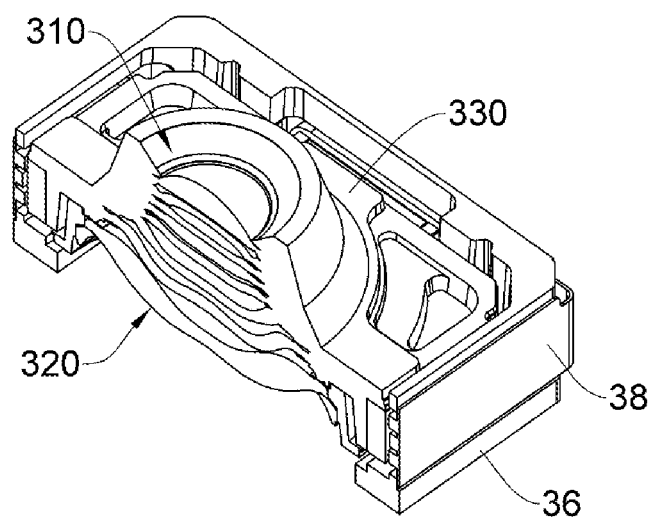
FIG. 14(a) is a cutaway view of the assembled lens assembly driving module according to the third embodiment of the present disclosure.
Figure 14B:
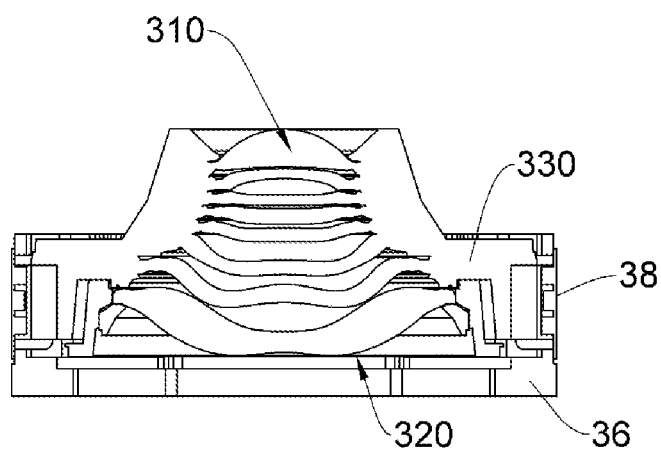
FIG. 14(b) is a cross-sectional view of the assembled lens assembly driving module according to the third embodiment of the present disclosure.

FIG. 14 is a perspective view of the assembled lens assembly driving module 3 according to the third embodiment of the present disclosure. FIG. 14(a) is a cutaway view based on FIG. 14. FIG. 14(b) is a cross-sectional view of the assembled lens assembly driving module 3.

Although the present disclosure is disclosed above by preferred embodiments, the preferred embodiments are not restrictive of the claims of the present disclosure. Equivalent changes and modifications made to the preferred embodiments without departing from the spirit embodied in the present disclosure must be deemed falling within the appended claims.

What is claimed is:

1. A lens assembly driving module, comprising:
    a photographing lens assembly comprising N lens elements and having an optical axis, the optical axis passing through the N lens elements, wherein N is a positive integer, and the N lens elements are consisted of a first lens assembly group and a second lens assembly group, the first lens assembly group is close to an object side and the second lens assembly group is close to an image side;
    a first driving mechanism comprising a first coil member and a first magnet which correspond in position to each other, for driving the N lens elements to move along the optical axis of the photographing lens assembly; and
    a second driving mechanism comprising a second coil member and a second magnet which correspond in position to each other, for driving the second lens assembly group to move along the optical axis to cause a relative distance along the optical axis of two adjacent lens elements between the first lens assembly group and the second lens assembly group to vary, wherein among relative distances along the optical axis of each of adjacent lens elements of the N lens elements, only the relative distance along the optical axis of the two adjacent lens elements caused to vary by the second driving mechanism is variable;
    wherein the lens elements driven by the second driving mechanism are in the number of F, where F is a positive integer, and the F lens elements include a plastic lens element, satisfying relation $1 \leq F < N/2$;
    wherein one of the F lens elements driven by the second driving mechanism is one of the lens elements in the photographing lens assembly and is positioned closest to the image side.

2. The lens assembly driving module of claim 1, wherein the N lens elements move along the optical axis.

3. The lens assembly driving module of claim 1, wherein the first driving mechanism and the second driving mechanism cause the two adjacent lens elements between the first lens assembly group and the second lens assembly group to move relative to each other along the optical axis.

4. The lens assembly driving module of claim 1, wherein the second driving mechanism further comprises a resilient member for connecting the adjacent lens elements.

5. The lens assembly driving module of claim 4, wherein the F lens elements driven by the second driving mechanism are also driven by the first driving mechanism to move along the optical axis.

6. The lens assembly driving module of claim 4, wherein the resilient member generates a preload force between the adjacent lens elements, and one of the adjacent lens elements moves toward the other lens element under the preload force.

7. The lens assembly driving module of claim 6, wherein the preload force acts in a direction parallel to the optical axis.

8. The lens assembly driving module of claim 1, wherein the second driving mechanism further comprises a preload mechanism for generating a preload force between the adjacent lens elements, such that one of the adjacent lens elements moves toward the other lens element under the preload force.

9. The lens assembly driving module of claim 5, wherein relation $1 \leq F < (1/3)*N$ is satisfied.

10. The lens assembly driving module of claim 1, wherein the photographing lens assembly further comprises a carrier member which defines an internal space, and the M lens elements driven by the first driving mechanism are disposed in the internal space, the F lens elements driven by the second driving mechanism are also disposed in the internal space.

11. The lens assembly driving module of claim 10, wherein the carrier member further comes with one of the first magnet and the second magnet.

12. The lens assembly driving module of claim 10, wherein the carrier member further comes with one of the first coil member and the second coil member.

13. The lens assembly driving module of claim 2, wherein relation $5 < N \leq 11$ is satisfied.

14. The lens assembly driving module of claim 2, wherein the first driving mechanism calibrates central image quality, and the second driving mechanism calibrates peripheral image quality.

15. The lens assembly driving module of claim 1, wherein the first driving mechanism drives the second driving mechanism to move along the optical axis.

16. An electronic device, comprising the lens assembly driving module of claim 1.

* * * * *